United States Patent
Morimoto et al.

(10) Patent No.: US 7,638,754 B2
(45) Date of Patent: Dec. 29, 2009

(54) BACKLIGHT DEVICE, DISPLAY APPARATUS INCLUDING BACKLIGHT DEVICE, METHOD FOR DRIVING BACKLIGHT DEVICE, AND METHOD FOR ADJUSTING BACKLIGHT DEVICE

(75) Inventors: Taiji Morimoto, Onomichi (JP); Tsukasa Inoguchi, Kitakatsuragi-gun (JP); Nobuhiro Nishiyama, Habikino (JP); Yuhichi Memida, Kitakatsuragi-gun (JP); Masanori Watanabe, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 11/545,042

(22) Filed: Oct. 6, 2006

(65) Prior Publication Data

US 2008/0245949 A1  Oct. 9, 2008

(30) Foreign Application Priority Data

Oct. 7, 2005  (JP) .............................. 2005-295774
Mar. 30, 2006  (JP) .............................. 2006-095865

(51) Int. Cl.
*H01J 40/14* (2006.01)
*G01J 3/50* (2006.01)
*H01J 5/16* (2006.01)

(52) U.S. Cl. ...................... 250/226; 250/206; 345/102; 349/61

(58) Field of Classification Search ................. 250/206, 250/226; 345/102, 205, 206, 207, 82, 83; 349/61

See application file for complete search history.

(56) References Cited

U.S. PATENT DOCUMENTS

| | | | |
|---|---|---|---|
| 5,724,062 A * | 3/1998 | Hunter | 345/102 |
| 6,439,731 B1 | 8/2002 | Johnson et al. | |
| 6,608,614 B1 * | 8/2003 | Johnson | 345/102 |
| 7,009,343 B2 * | 3/2006 | Lim et al. | 315/150 |

(Continued)

FOREIGN PATENT DOCUMENTS

| | | |
|---|---|---|
| CN | 1908748 | 2/2007 |
| JP | 2002-064842 A | 2/2002 |
| JP | 2002-281531 A | 9/2002 |
| JP | 2004-286971 A | 10/2004 |
| WO | WO-00/137904 A1 | 6/2000 |
| WO | WO-02/080625 A1 | 10/2002 |
| WO | WO-2005/057275 | 6/2005 |

OTHER PUBLICATIONS

Kakinuma, K. (Jul. 2005). "Wide Color Gamut Reproducing Technique of LCD Television 'LED Backlight for QUALIA 005'," *Monthly Display*, pp. 41-49 (including English partial translation).

*Primary Examiner*—Seung C Sohn
(74) *Attorney, Agent, or Firm*—Morrison & Foerster LLP

(57) ABSTRACT

A direct-type backlight device for a non-self-luminous image display panel has a light-emitting area corresponding to a display area of the image display panel. The light-emitting area is arranged by combining a plurality of backlight substrates each of which is provided with (i) a color sensor for detecting an incident light intensity and (ii) red, green, and blue LEDs whose respective light intensities are controlled in accordance with a detection result obtained by the color sensor. This arrangement allows reduction of brightness unevenness entirely in the light-emitting area of the backlight device.

29 Claims, 23 Drawing Sheets

U.S. PATENT DOCUMENTS

| | | | |
|---|---|---|---|
| 7,214,927 B2 * | 5/2007 | Lim et al. | 250/229 |
| 7,423,626 B2 * | 9/2008 | Yamamoto et al. | 345/102 |
| 2002/0159002 A1 * | 10/2002 | Chang | 349/61 |
| 2003/0230991 A1 * | 12/2003 | Muthu et al. | 315/307 |
| 2004/0061814 A1 * | 4/2004 | Kim et al. | 349/65 |
| 2005/0128374 A1 | 6/2005 | Furukawa | |
| 2006/0007097 A1 | 1/2006 | Ichikawa | |
| 2006/0097978 A1 * | 5/2006 | Ng et al. | 345/102 |
| 2006/0103612 A1 | 5/2006 | Ozaki | |
| 2007/0030697 A1 | 2/2007 | Kim | |

* cited by examiner

FIG. 5

| | | | | | | |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |

7 ROWS WIDE
7 LINES HIGH
31(71)

FIG. 7

| SCREEN TYPE (INCH) | SCREEN SIZE | | NUMBER OF BACKLIGHT SUBSTRATES | |
|---|---|---|---|---|
| | WIDTH mm | HEIGHT mm | WIDE | HIGH |
| 13 | 288 | 162 | 2.00 | 2.00 |
| 15 | 332 | 187 | 2.31 | 2.31 |
| 20 | 443 | 249 | 3.07 | 3.07 |
| 26 | 576 | 324 | 4.00 | 4.00 |
| 32 | 708 | 398 | 4.92 | 4.92 |
| 37 | 819 | 461 | 5.69 | 5.69 |
| 40 | 886 | 498 | 6.15 | 6.15 |
| 42 | 930 | 523 | 6.46 | 6.46 |
| 45 | 996 | 560 | 6.92 | 6.92 |
| 46 | 1018 | 573 | 7.07 | 7.07 |
| 52 | 1151 | 648 | 7.99 | 7.99 |
| 57 | 1262 | 710 | 8.76 | 8.76 |
| 58 | 1284 | 722 | 8.92 | 8.92 |
| 59 | 1306 | 735 | 9.07 | 9.07 |
| 65 | 1439 | 809 | 9.99 | 9.99 |

BACKLIGHT DEVICE, DISPLAY APPARATUS INCLUDING BACKLIGHT DEVICE, METHOD FOR DRIVING BACKLIGHT DEVICE, AND METHOD FOR ADJUSTING BACKLIGHT DEVICE

This Nonprovisional application claims priority under 35 U.S.C. §119(a) on Patent Application No. 295774/2005 filed in Japan on Oct. 7, 2005, and Patent Application No. 095865/2006 filed in Japan on Mar. 30, 2006, the entire contents of which are hereby incorporated by reference.

FIELD OF THE INVENTION

The present invention relates to (i) a direct-type backlight device that is used for a non-self-luminous image display panel such as a liquid crystal display panel and (ii) a liquid crystal display apparatus using the direct-type backlight device, and is particularly suitable for (a) a backlight device using an LED as a light source and (b) a liquid crystal display apparatus using the backlight device.

BACKGROUND OF THE INVENTION

Background Art of the First Invention

Conventionally, an LED backlight in which LEDs (light-emitting diode) are adopted as a light source has been used as a backlight for a liquid crystal display apparatus. Controlling luminance and chromaticity has been an important subject for study, when using an LED backlight.

The reasons are as follows: LEDs differ from element to element in their luminescence properties. Particularly, the luminescence properties differ from production unit to production unit. As such, if LEDs of different production units are used for a single backlight, then luminance unevenness and/or color unevenness occur. Furthermore, since LEDs are semiconductor elements, their luminescence properties such as luminous efficiency and/or luminescence peak wavelengths also have changes due to a temperature change and/or a moment-to-moment change, and the rate of such changes differ from production unit to production unit. In view of the circumstances, there has been conventionally made an effort, for example, (i) to use as many LEDs as possible of the same production unit or (ii) to select and use LEDs having a uniform property.

There has been conventionally developed a technique for carrying out, by feeding back signals sent from a color sensor and/or a temperature sensor that are mounted on an LED backlight, a control such that the luminance and chromaticity of the backlight become constant (e.g., see Koichiro Kakinuma, "Wide Color Gamut Reproducing Technique of LCD Television 'LED Backlight for QUALIA 005'", Monthly DISPLAY, July 2005).

On the other hand, a so-called calibration system, which (i) detects a color of a display screen image by using a sensor and (ii) adjusts the color, has been known as a technique for adjusting a color which an image display apparatus displays (e.g., see Japanese Unexamined Patent Publication No. 64842/2002 (Tokukai 2002-64842; published on Feb. 28, 2002) and Japanese Unexamined Patent Publication No. 281531/2002 (Tokukai 2002-281531; published on Sep. 27, 2002).

Background Art of the Second Invention

Recently, there has been being developed either (i) a system in which a combination of a conventionally-used cold cathode fluorescent light (hereinafter referred to as "CCFL") and light-emitting diodes (hereinafter referred to as "LEDs") is used as a light source of a backlight used for a liquid crystal apparatus, or (ii) a system in which only LEDs are used, instead of CCFLs, as a light source. Particularly, a system in which the three primary colors red, green, and blue are obtained by using LEDs alone has a feature of wider color reproducibility region (NTSC ratio) as compared to a system using a conventional CCFL. The reason for this is that: each of the LEDs has a narrow half-value width of emission spectrum, and so almost pure red, green, and blue are obtained. Furthermore, since it is possible to adjust brightness for each of the colors in accordance with an electric current, such a system has a feature of variable color balance. Further, since the LEDs are free of mercury, the system exhibits excellent environmental friendliness.

FIGS. 25(a) and 25(b) show an example of a backlight device, disclosed in U.S. Pat. No. 6,439,731 (issued on Aug. 27, 2002), which uses LEDs. FIG. 25(a) is a rear view of the device, and FIG. 25(b) is a front view of the device. LEDs 131 are assembled substantially over the entire front surface of a printed circuit board 130. Further, the printed circuit board 130 has a rear surface on which (i) a luminance adjusting circuit 132 and (ii) a semiconductor chip 133 including a driver and a control circuit are provided, so that driving of the LEDs 131 is controlled. On the rear surface of the printed circuit board 130, a heat sink 134 is provided so that heat due to (a) the LEDs 131, (b) the luminance adjusting circuit 132, which is provided on the rear surface of the printed circuit board 130, and (c) the semiconductor chip 133, which is provided on the rear surface of the printed circuit board 130, is radiated efficiently. For the purpose of improving thermal conductivity by bringing the printed circuit board 130 and the heat sink 134 into close contact with each other, the heat sink 134 is provided with a concavity 135 so that the luminance adjusting circuit 132 and the semiconductor chip 133, each of which is provided on the rear surface of the printed circuit board 130, can be stored in the cavity 135. Further, provided on the front surface of the printed circuit board 130 is a diffusion plate 136 for uniforming light emitted from the LEDs 131. Further, a liquid crystal panel 138 is provided on a front side of an optical chamber 137 that houses the heat sink 134, the printed circuit board 130, and the diffusion plate 136. This arrangement realizes, as a whole, a liquid crystal display apparatus which uses the LEDs 131 as a backlight.

Further, WO 02/080625 (published on Oct. 10, 2002) discloses an LED backlight which includes red, green, and blue LEDs and a set of light sensors that respectively detect three colors of red, green, and blue, and in which respective luminances and chromaticities of the LEDs are stabilized by using the set of light sensors. The LED lighting device includes a memory array in addition to the LEDs and the light sensors. The memory array can store respective values of color and lumen output that have been set by a user. According to the LED lighting device, these values can be read out from the memory in accordance with the user's selection.

Further, WO 00/037904 (published on Jun. 29, 2000) discloses a backlight device in which respective luminances and chromaticities of red, green, and blue LEDs are stabilized by driving a single light sensor in a time-sharing manner.

Further, Japanese Unexamined Patent Publication No. 286971/2004 (Tokukai 2004-286971; published on Oct. 14, 2004) discloses a backlight device which uses a light guide plate and in which uniform luminance and uniform chromaticity can be obtained by using (i) four RGB light sources that are provided at upper and lower ends of a display area and (ii) four color sensors that are disposed at left and right ends of the display area. Here, the four light sources do not meet one-to-one correspondence with respect to outputs of the four sensors, respectively, and a feedback control is made by, in order to carry out a matrix operation, comparing each output of the sensors with data stored in correlation data memory and light source reference light-emitting amount memory that are common to the four light sources and the four sensors.

Further, for the purpose of reducing current consumption and absorbing variations in characteristics of LEDs, United States Unexamined Patent Publication No. 2006103612 (published on May 18, 2006) discloses a device in which applied voltage storage registers store driving voltages for driving red, green, and blue LEDs, respectively, and in which the red, green, and blue LEDs are driven by independent driving voltages. The LED driving device has an R (red) applied voltage storage register, a G (green) applied voltage storage register, a B (blue) applied voltage storage register, an R duty ratio storage register, a G duty ratio storage register, and a B duty ratio storage register. According to this arrangement and this method, independent minimum driving voltages are applied to the red, green, and blue LEDs in accordance with the voltage values stored in applied voltage storing means, respectively. This allows current consumption to be less as compared with a case where an identical driving voltage is applied to the red, green, and blue LEDs.

SUMMARY OF THE INVENTION

Disclosure of the First Invention

However, with the technique disclosed in "Wide Color Gamut. Reproducing Technique of LCD Television 'LED Backlight for QUALIA 005'", it is difficult to sufficiently inhibit luminance unevenness and chromaticity unevenness from occurring across the screen.

The reason for this is as follows. According to the technique, since the color sensor is provided on a side surface of the LED backlight, it is impossible to individually detect luminance and chromaticity in each part of a screen, i.e., detect luminance unevenness and chromaticity unevenness although it is possible to detect luminance and chromaticity on the entire screen.

Further, each of the techniques respectively disclosed in the aforementioned Japanese Unexamined Patent Publications Tokukai 2002-64842 and Tokukai 2002-281531 is a calibrating technique. Therefore, it is difficult to carry out control for suppressing luminance unevenness and chromaticity unevenness under the state in which an image display apparatus is normally used.

The present invention has been made in view of the foregoing problems, and it is an object of the present invention to realize a backlight device in which it is possible to reduce brightness unevenness and, more preferably, even color unevenness entirely in a light-emitting area.

In order to attain the foregoing object, a backlight device according to the present invention is a backlight device which is a direct type and which is used for a non-self-luminous image display panel, the backlight device, including: a light-emitting area corresponding to a display area of the image display panel, the light-emitting area including a plurality of small areas each of which is provided with (i) a light detecting section for detecting an intensity of light incident thereon and (ii) one or more light-emitting sections whose respective light intensities are controlled in accordance with a detection result obtained by the light detecting section.

With the foregoing arrangement, in each of the plurality of small areas constituting the light-emitting area, the light detecting section detects an intensity of light incident on the light detecting section. In accordance with the detection result obtained by the light detecting section, the respective light intensities of the light-emitting sections disposed in the small area are controlled.

Therefore, with the foregoing arrangement, it is possible to divide the light-emitting area into the small areas and to adjust the light intensities for each of the small areas.

As a result, it becomes possible to make an adjustment so that brightness unevenness is suppressed for each of the small areas constituting the light-emitting area. This makes it possible to reduce brightness unevenness entirely in the light-emitting area.

A display apparatus according to the present invention is arranged so as to include: the foregoing backlight device; and a non-self-luminous image display panel for displaying an image by controlling a transmission state of light emitted from the backlight device.

With the foregoing arrangement, it is possible to reduce brightness unevenness on a display screen.

Disclosure of the Second Invention

Recently, it has been proposed that an LED backlight be applied to a large liquid crystal display apparatus. In such a case, when a substrate on which LEDs have been provided is simply enlarged, there occurs such a problem that brightness (luminance) unevenness or color (chromaticity) unevenness due to temperature variations in the substrate becomes prominent. The variations in temperature within the substrate can be corrected to some extent by an arrangement using a light sensor. However, it is difficult to overcome luminance unevenness or chromaticity unevenness entirely. Further, when the substrate is divided, a damaged part can be repaired easily. In view of this, it is conceivable to arrange a backlight so as to have a plurality of substrates on which LEDs have been provided.

However, in cases where an LED backlight is arranged by using a plurality of substrates, there is such a problem that it is difficult to make an adjustment so as to match the chromaticity or luminance of one substrate to the chromaticity and luminance of another substrate. When the adjustment is insufficient and such a backlight device is used as a backlight, especially, for a liquid crystal display, there occurs variations in luminance or chromaticity in a display area of the liquid crystal display. Further, for this reason, in cases where one of the substrates is damaged and therefore is repaired or replaced, it takes a lot of trouble to make an adjustment so that the repaired or replacing substrate emits light identical to light emitted from neighboring substrates.

It is an object of the present invention to provide (i) a backlight device in which each substrate is automatically adjusted so as to have a predetermined luminance or chromaticity and which emits light uniformly, (ii) a display apparatus using the backlight device, and (iii) a method for driving the backlight device.

Further, it is an object of the present invention to provide a method for adjusting substrates constituting such a backlight device.

The present invention is a backlight device, including: a plurality of substrates each of which includes one or more light-emitting elements, a light sensor, and a memory; and a driving circuit for driving each of the light-emitting elements, wherein the memory of each of the substrates stores information corresponding to a value of an output produced by the light sensor under such condition that the light-emitting element emits light having a predetermined luminance or chromaticity.

According to the present invention, in the backlight device including the plurality of substrates, the memory of each of the substrates stores, in advance, information corresponding to a value of an output produced by the light sensor under such condition that the light-emitting element provided in the substrate emits light having a predetermined luminance or chromaticity. By using this information, the value of the output of the light sensor is standardized. Feedback control of the light-emitting element provided in the substrate is carried out such that the standardized value of the output of the light sensor corresponds to a set value of luminance or chromaticity. With this, an automatic adjustment is carried out such that a predetermined value of luminance or chromaticity is obtained for the substrate. Therefore, since the substrate is not affected by variations in the light sensor, a backlight device that emits light uniformly can be obtained simply by combining the substrates unadjusted. Accordingly, simply by replacing a damaged substrate with a substrate having a memory storing such information, it is possible to arrange a backlight device in which a plurality of substrates emit light of uniform luminance or chromaticity even after one of the substrates has been replaced by another substrate.

The present invention is a display apparatus, including: the foregoing backlight device; and a non-self-luminous image display panel for displaying an image by controlling a transmission state of light emitted from the backlight device.

Further, according to the present invention, it is possible to provide, by combining (i) the backlight device having excellent uniformity with (ii) the non-self-luminous image display panel, a display apparatus having excellent display quality.

The present invention is a method for driving a backlight device including: (i) a plurality of substrates each of which includes one or more light-emitting elements, a light sensor, and a memory; (ii) a driving circuit; and (iii) a control circuit, the memory storing information corresponding to a value of an output produced by the light sensor under such condition that each of the light-emitting elements provided in each of the substrates emits light having a predetermined luminance or chromaticity, the method, including the steps of: causing the driving circuit to drive the light-emitting element; and causing the control circuit to (i) standardize the output of the light sensor in accordance with the information stored in the memory, (ii) generate such a control signal for the driving circuit that the standardized output of the light sensor becomes equal to a set luminance or chromaticity, and (iii) transmit the control signal to the driving circuit.

Further, according to the present invention, it is possible to provide a method for driving the backlight device having excellent uniformity.

The present invention is a method for adjusting a backlight device including a plurality of substrates each of which includes one or more light-emitting elements, a light sensor, and a memory, the method, including: a first step of (i) driving each of the light-emitting elements and (ii) detecting, by using an external light sensor used substantially commonly for the substrates, a light intensity of the light-emitting element; a second step of calculating a light sensor output reference value that is expected from an output produced by the light sensor in the first step; and a third step of storing the light sensor output reference value in the memory, the first, second, and third steps being carried out for each of the substrates.

Further, according to the present invention, it is possible to provide a method for adjusting a substrate that can be incorporated directly into the backlight device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 is a plan view showing a configuration of backlight substrates each constituting the backlight unit.

FIG. 7 is a chart showing a relationship between (i) a screen size and (ii) the number of backlight substrates for constituting the screen size.

DESCRIPTION OF THE EMBODIMENTS

Embodiment 1 of the First Invention

Figure 1:
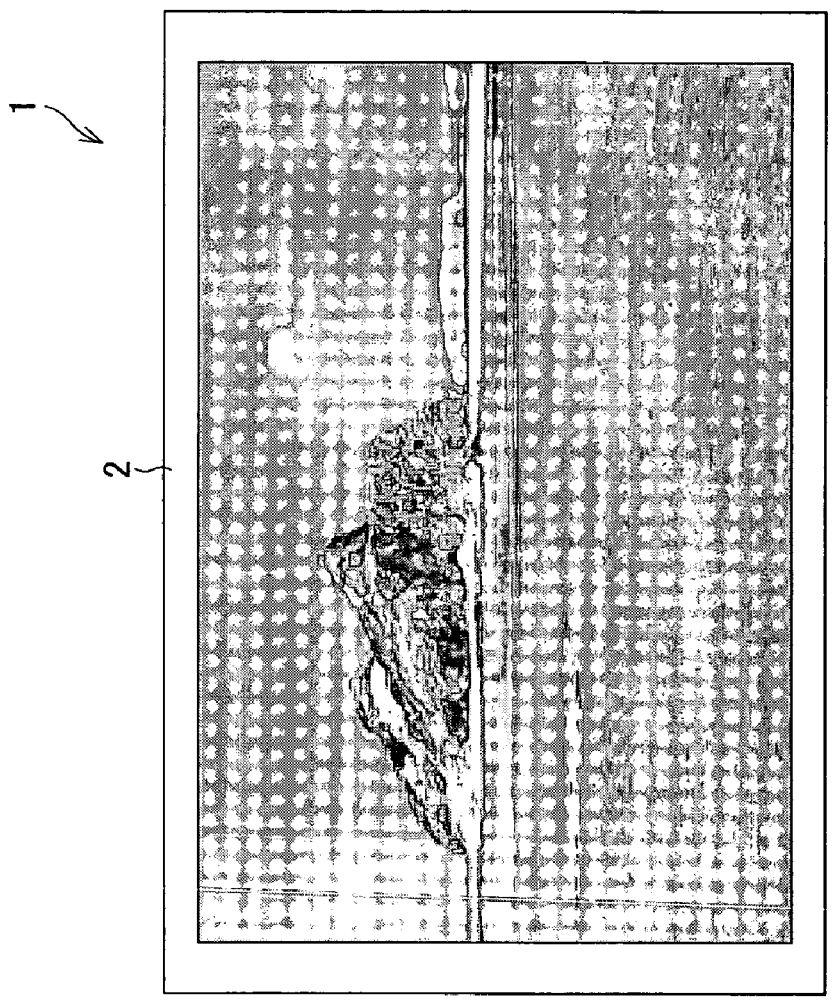
FIG. 1(a) is a plan view showing a liquid crystal display apparatus of Embodiment 1 of the First Invention.
FIG. 1(b) is a side view showing the liquid crystal display apparatus.
Figure 1:
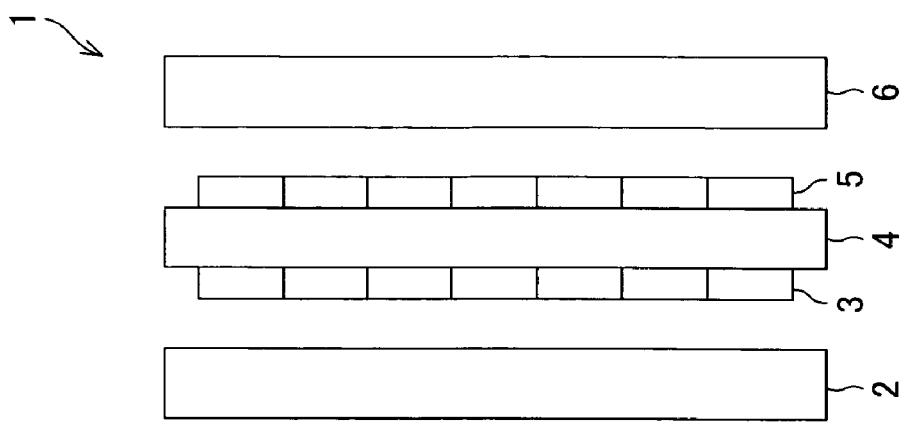
Figure 2:
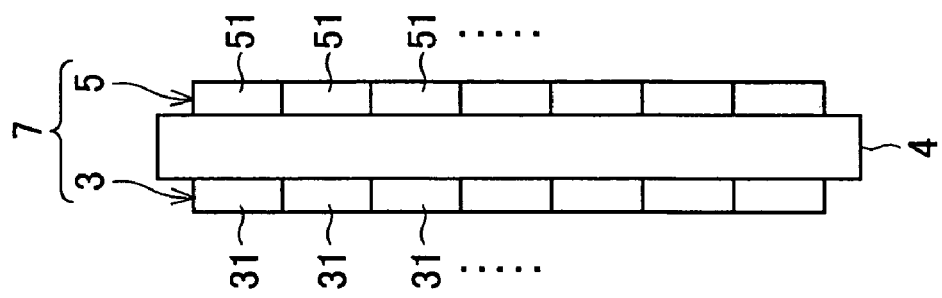
FIG. 2(a) is a plan view showing a backlight and an internal frame each provided in the liquid crystal display apparatus.
FIG. 2(b) is a side view showing the backlight, the internal frame, and a backlight control circuit each provided in the liquid crystal display apparatus.
Figure 2:
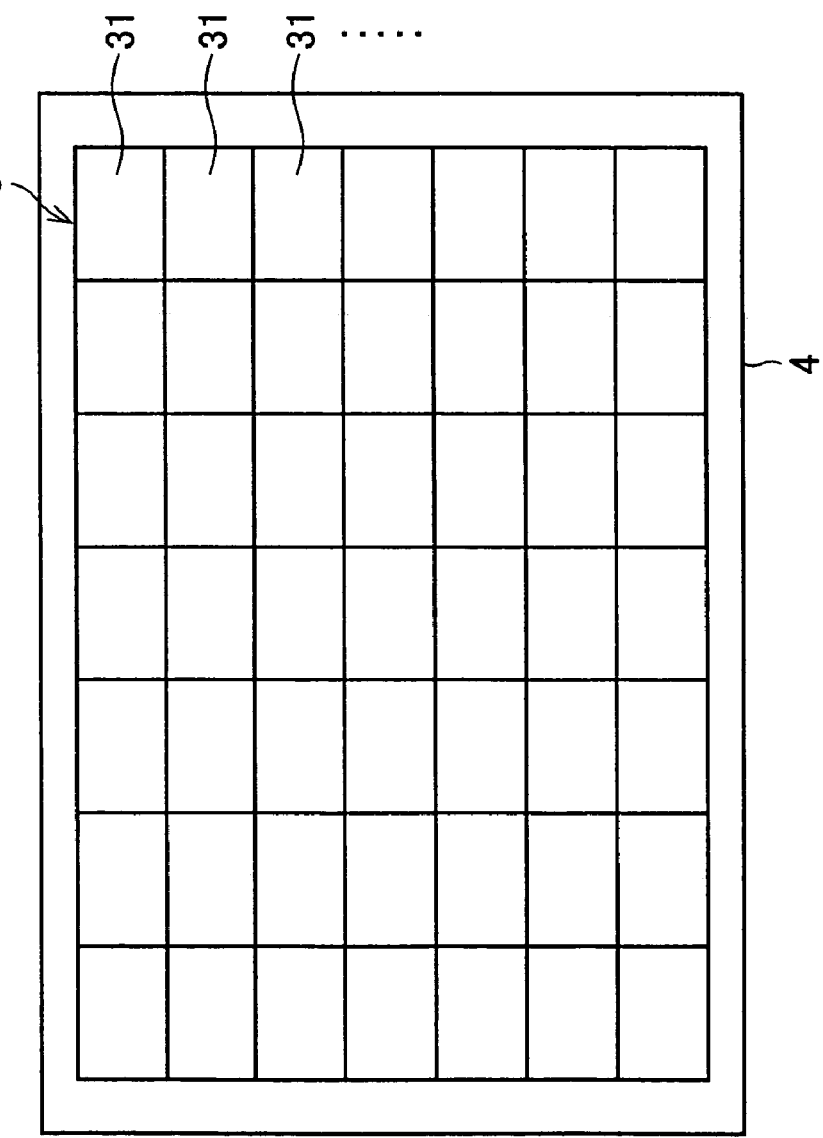

Embodiment 1 of the present invention will be described below with reference to FIGS. 1 through 11.

First, an arrangement of a liquid crystal display apparatus (display apparatus) 1 according to the present embodiment will be schematically described with reference to FIGS. 1(a) and 1(b). The liquid crystal display apparatus 1 includes a liquid crystal unit 2, a backlight 3, an internal frame 4, a backlight control section (control section) 5, and a driving and power supply circuit 6, which are disposed in this order from a front side of the liquid crystal display apparatus 1 toward a rear side of the liquid crystal display apparatus 1.

Among these components of the liquid crystal display apparatus 1, the liquid crystal unit 2 and the driving and power supply circuit 6 are conventional ones.

That is, the liquid crystal unit 2 includes a pair of substrates between which sandwich a liquid crystal material is sandwiched and on which a color filter, a polarizing film, and other members are provided. Further, the driving and power supply circuit 6 carries out driving and control of the entire liquid crystal display apparatus 1 by supplying the liquid crystal unit 2, the backlight control section 5, and other members with (i) power for operating and (ii) signals for them.

In the following, the backlight 3 and the backlight control section 5 each according to the present embodiment will be described.

The backlight 3 is designed to supply white light to the liquid crystal unit 2, which is a non-self-luminous image display panel. The backlight 3 is arranged so that a large number of light-emitting elements are mounted on a substrate.

As will be described later, the backlight 3 of the present embodiment is arranged by combining a plurality of substrates each having light-emitting elements mounted thereon. A light-emitting element to be mounted on each of the substrates is adjusted in advance so as to have a predetermined luminance and a predetermined chromaticity.

However, when the substrates are combined and the light-emitting elements mounted on each of the substrates are turned on while the substrates have been set to the same setting, luminance unevenness and color unevenness occur in a display area of the liquid crystal unit 2. The simple reason for this is that an area of substrates disposed in a central portion of the liquid crystal unit 2 and an area of substrates disposed in a peripheral portion of the liquid crystal unit 2 are different from each other in terms of ambient incoming light conditions, temperature conditions, and the like.

In view of this, according to the backlight 3 of the present embodiment, luminance and chromaticity are measured for each of the substrates by using a sensor, and an automatic adjustment is carried out so that a predetermined luminance and a predetermined chromaticity are obtained. With this, luminance unevenness and color unevenness are suppressed in the entire display area of the liquid crystal unit 2, so that luminance and chromaticity are uniform.

Further, the continuing use of the backlight 3 causes (i) a change in temperature distribution in the display area of the liquid crystal unit 2, (ii) a change in ambient temperature in the display area of the liquid crystal unit 2, (iii) a moment-to-moment change in respective luminescence intensities of the light-emitting elements, (iv) variations in the moment-to-moment change among the light-emitting elements, and (v) the like. This causes the entire display area to lose uniformity in luminance and chromaticity.

In view of this, according to the backlight 3 of the present embodiment, even while the liquid crystal display apparatus 1 is being used, the adjustment using the sensor is carried out so that a predetermined luminance and a predetermined chromaticity are obtained. With this, luminance unevenness and color unevenness are suppressed.

For that purpose, the backlight 3 and the backlight control section 5 each according to the present embodiment are arranged as described below.

As shown in FIGS. 2(a) and 2(b), the backlight 3 of the present embodiment is not made up of a single substrate, but is made up of a large number of backlight substrates 31 each of which has a size corresponding to a size of each of portions obtained by equally dividing the display area of the liquid crystal unit 2 in a matrix manner. The backlight substrates 31 are fixed onto a front-side surface of the internal frame 4 so as to be disposed in a matrix manner.

Further, the backlight control section 5 controls the light-emitting elements of the backlight 3. The backlight control section 5 includes: a large number of control substrates 51 provided so as to respectively correspond to the backlight substrates 31; and control circuits respectively mounted on the control substrates 51.

The following description assumes such an arrangement that the backlight substrates 31 and the control substrates 51 meet one-to-one correspondence with respect to each other. In this case, the backlight substrates 31 and the control substrates 51 that correspond to each other are connected, for example, by flexible wires through openings (not shown) formed in the internal frame 4, respectively. With such an arrangement, it becomes easy to understand correspondence between the backlight substrates 31 and the control substrates 51, and each of the wires respectively connecting the backlight substrates 31 to the control substrates 51 has a short length. This brings about such an advantage that: the influence of noise is limited, so that a signal has a good S/N ratio.

However, when it becomes necessary to dispose another circuit or the like on a rear-side surface of the internal frame 4, the foregoing arrangement may be hardly realized.

The control substrates 51 can be disposed in many variations, and it is possible to arrange a backlight control section 5 that is not divided into a large number of control substrates 51.

The backlight 3 and the backlight control section 5 constitute a direct-type backlight device 7 according to the present invention. The direct-type backlight device 7 includes an arrangement in which there are provided (i) a pair of a backlight substrate 31 and a control substrate 51 that correspond to each other as described above and (ii) circuit elements respectively mounted on the backlight substrate 31 and the control substrate 51. Such an arrangement is referred to as "backlight units 71" (see FIG. 3).

Note that a direct-type backlight device refers to such an arrangement that a plurality of light sources are arranged directly below a back side of a display area of a non-self-luminous image display panel such as a liquid crystal unit 2.

Figure 3:
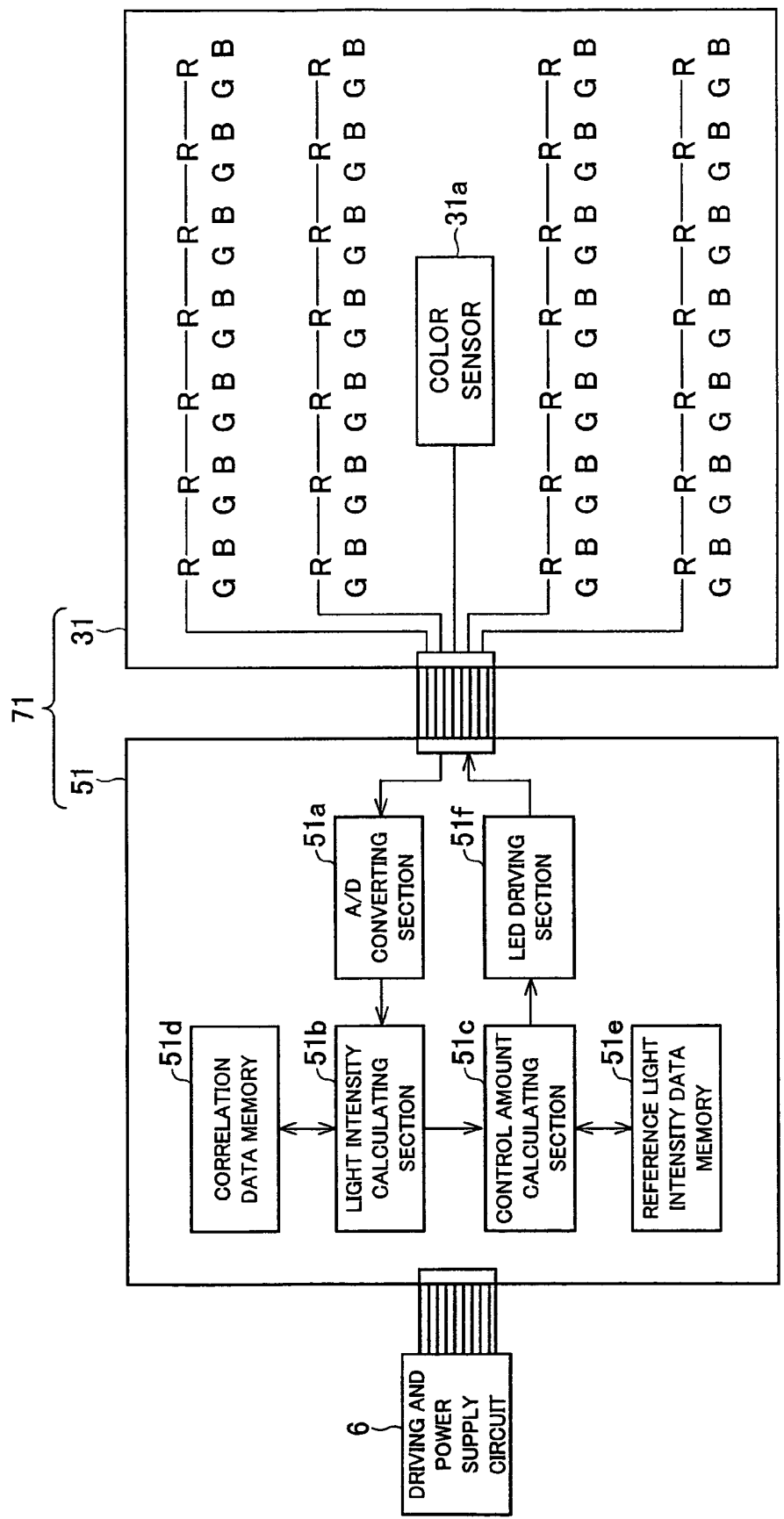
FIG. 3 is a plan view showing an arrangement of a backlight unit provided in the liquid crystal display apparatus.
Figure 4:
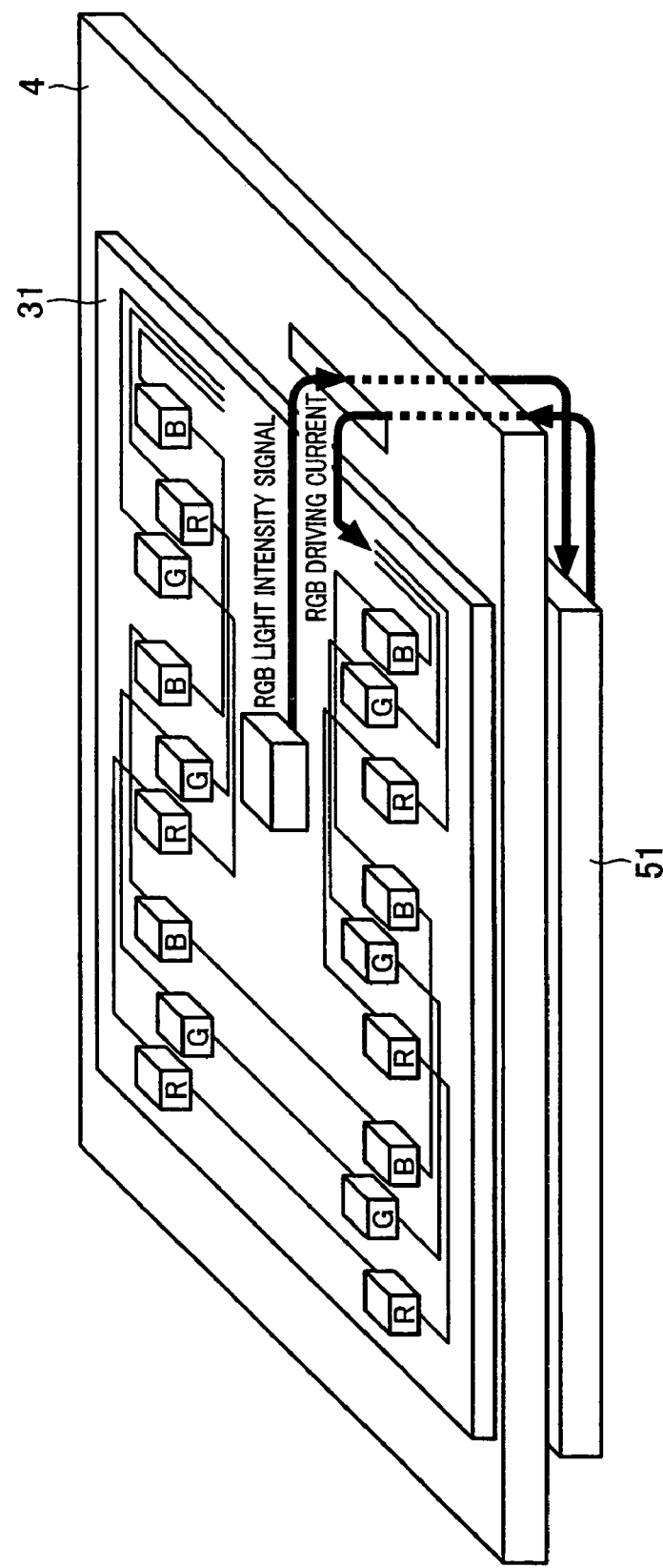
FIG. 4 is a perspective view showing the backlight unit mounted on the internal frame of the liquid crystal display apparatus.

The arrangement of the backlight unit 71 will be fully described with reference to FIG. 3. FIG. 3 illustrates the backlight substrate 31 and the control substrate 51 that are arranged in a plane. However, as shown in FIG. 4, the backlight substrate 31 and the control substrate 51 are mounted on the internal frame 4 so as to sandwich the internal frame 4.

The backlight substrate 31 includes, as light-emitting elements, a plurality of red LEDs, a plurality of green LEDs, and a plurality of blue LEDs. Note that: in FIG. 3, each of the red LEDs, each of the green LEDs, and each of the blue LEDs are represented by "R", "G", and "B", respectively. The red, green, and blue LEDs are independently wired, and therefore are independently driven. That is, respective light intensities of the red, green, and blue LEDs can be adjusted individually.

Further, the backlight substrate 31 has a color sensor (light detecting section) 31a mounted near the center of the backlight substrate 31. The color sensor 31a detects respective light intensities of red, green, and blue components of light reaching the location of the color sensor 31a, and outputs a three-channel signal indicating the respective light intensities of the red, green, and blue components.

According to the foregoing arrangement, an area, corresponding to the backlight substrate 31, in the display area of the liquid crystal unit 2 is illuminated mainly by light emitted from the red, green, and blue LEDs mounted on the backlight substrate 31, and the color sensor 31a mounted on the backlight substrate 31 detects respective light intensities of red, green, and blue components of average light that illuminates the area.

Meanwhile, the control substrate 51 controls the respective light intensities of the red, green, and blue LEDs of the corresponding backlight substrate 31 in accordance with the light intensities of the red, green, and blue components, which light intensities have been detected by the color sensor 31a of the corresponding backlight substrate 31.

For that purpose, the control substrate 51 includes an A/D converting section 51a, a light intensity calculating section 51b, a control amount calculating section 51c, a correlation data memory 51d, a reference light intensity data memory 51e, and an LED driving section 51f. The following explains a control operation carried out by the components.

The three-channel analog signal (the signal indicating the respective light intensities of the red, green, and blue components) sent from the color sensor 31a is converted into a digital signal by the A/D converting section 51a, and the digital signal is sent to the light intensity calculating section 51b.

The light intensity calculating section 51b specifies, in accordance with the digital signal that is sent from the A/D converting section 51a and with reference to correlation data stored in the correlation data memory 51d, light intensities (predicted light intensities) which the red, green, blue LEDs are respectively predicted to have. The light intensity calculating section 51b outputs a signal indicative of the predicted light intensities to the control amount calculating section 51c.

Note that the correlation data stored in the correlation data memory 51d is data which takes the form of a look-up table and which indicates an experimentally pre-calculated correlation between (i) the respective light intensities of the red, green, and blue components, which light intensities are detected by the color sensor 31a, and (ii) the respective predicted light intensities of the red, green, and blue LEDs.

The control amount calculating section 51c makes a comparison between (i) the respective predicted light intensities of the red, green, and blue LEDs as specified by the light intensity calculating section 51b and (ii) reference light intensity data stored in the reference light intensity data memory 51e. The control amount calculating section 51c calculates a control amount for matching the respective light intensities of the red, green, and blue LEDs to the reference light intensities. The control amount calculating section 51c outputs a signal indicative of the control amount to the LED driving section 51f.

Note that the reference light intensity data stored in the reference light intensity data memory 51e is data which indicates reference values for the respective light intensities of the red, green, blue LEDs.

The LED driving section 51f generates, in accordance with the signal sent from the control amount calculating section 51c, a driving signal for driving the red, green, and blue LEDs, and supplies the driving signal to the red, green, and blue LEDs. The driving signal may be a current signal that causes the light intensities to be changed depending on a current value, or may be a PWM signal that causes the light intensities to be changed depending on a pulse width.

The backlight control section 5 is connected to the driving and power supply section 6. The driving and power supply section 6 supplies power to the backlight control section 5, and carries out overall control (control common to all the control substrates 51, e.g., changing of the light intensity of the entire screen) of the backlight control section 5.

Backlight units 71 as described above are disposed in a matrix manner as shown in FIG. 5, so that a light-emitting area that corresponds to the display area of the liquid crystal unit 2 is realized.

The backlight substrate 31 has a height of 81 mm and has a width of 144 mm. A total of 49 backlight substrates 31, i.e., 7×7 backlight substrates 31 (7 backlight substrates 31 wide by 7 backlight substrates 31 high) are disposed, so that a light-emitting area that corresponds to a 46-inch display area having a height of 573 mm and a width of 1018 mm is realized. Further, each of the backlight substrates 31 includes: (i) a total of 28 sets of red, green, and blue LEDs, i.e., 7×4 sets of red, green, and blue LEDs (In FIG. 4, for the purpose of simplicity, the number of sets of red, green, and blue LEDs is less than 28); and (ii) a color sensor 31a. These concrete figures serve as an example, and can be changed in various ways.

As described above, the backlight 3 has a light-emitting area that corresponds to the display area of the liquid crystal unit 2. (In FIG. 5, the light-emitting area corresponds to the area in which the 7×7 backlight substrates 31 are bedded.) The light-emitting area is made up of a plurality of small areas. (In FIG. 5, the small areas respectively correspond to the backlight substrates 31.) Disposed in each of the small areas are (i) a color sensor 31a and (ii) sets of red, green, and blue LEDs whose respective light intensities are controlled in accordance with a detection result obtained by the color sensor 31a.

With this, the color sensor 31a detects a light intensity in each of the small areas, and the respective light intensities of the red, green, and blue LEDs can be controlled in accordance with the detection result.

This control is carried out such that, as described above, the respective light intensities of the red, green, and blue LEDs correspond to the reference light intensity data stored in the reference light intensity data memory 51e. Therefore, when the same reference light intensity data is used for each of the backlight substrates 31, the small area has such a brightness that the entire light-emitting area has a substantially uniform brightness. That is, it becomes possible to carry out such an adjustment as to suppress uneven brightness in each of the small areas of the light-emitting area. This makes it possible to reduce uneven brightness in the entire light-emitting area.

Further, the color sensor 31a detects the respective light intensities of the red, green, and blue components of the light reaching the location of the color sensor 31a, and the red, green, and blue LEDs are controlled so that the respective light intensities of the red, green, and blue LEDs correspond to the reference light intensities. This makes it possible to adjust, to a color determined by the respective reference light intensities of the red, green, and blue LEDs, a color obtained by mixing respective colors of the red, green, and blue LEDs. This makes it possible to reduce color unevenness as well as uneven brightness.

The arrangement may be such that only uneven brightness is reduced. In such a case, it is not necessary to detect the respective light intensities of the red, green, and blue components, the color sensor 31a may be replaced by a sensor capable of detecting a whole intensity of visible light.

Figure 6:
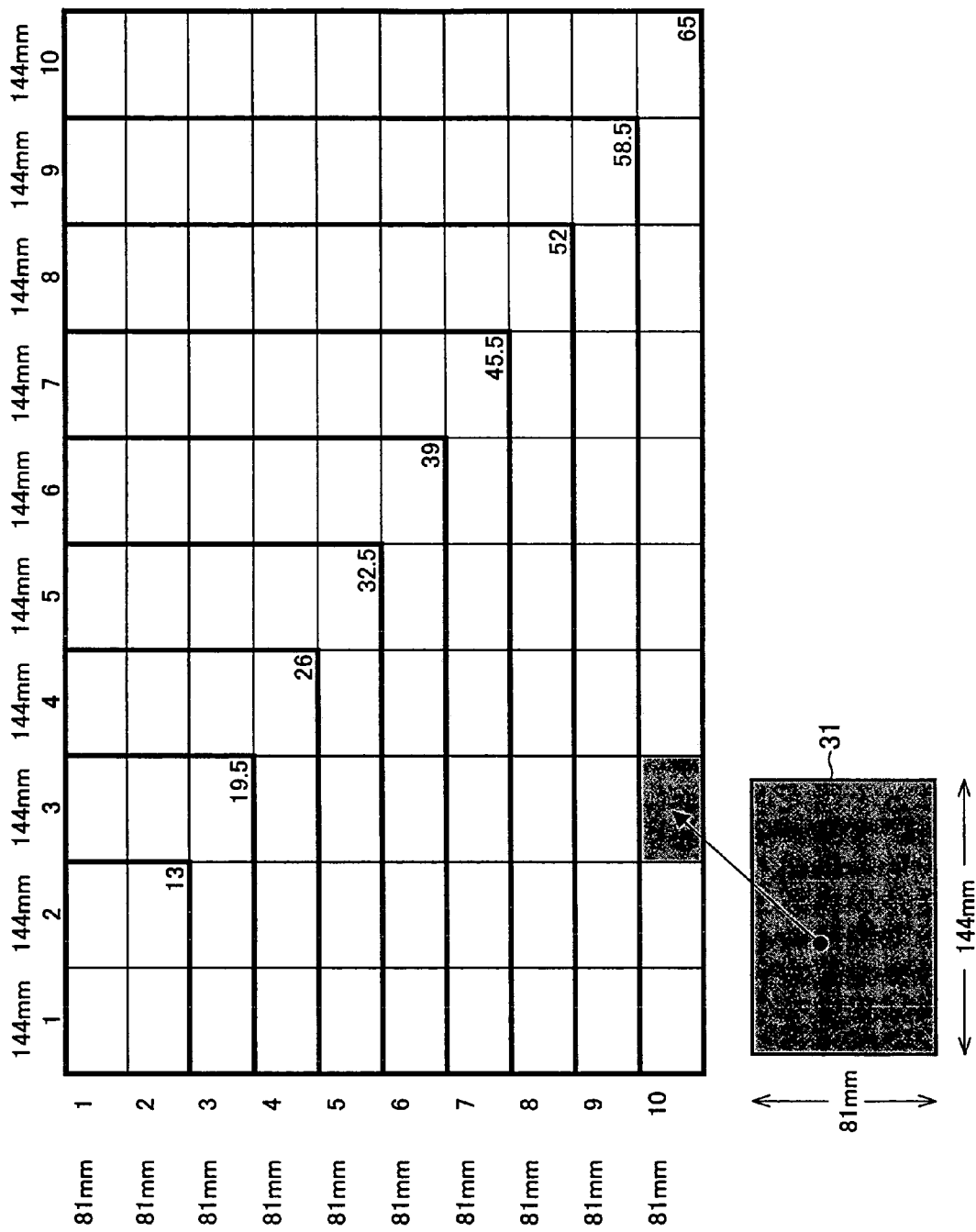
FIG. 6 is a diagram for explaining that backlights having light-emitting areas of various sizes can be arranged by combining the backlight substrates.

Further, the light-emitting area only needs to include a plurality of small areas each of which is provided with (i) a color sensor 31a and (ii) red, green, and blue LEDs whose respective light intensities are controlled in accordance with a detection result obtained by the color sensor 31a. Therefore, the light-emitting area does not need to be divided into substrates that respectively correspond to the small areas. However, by dividing the light-emitting area into the substrates that respectively correspond to the small areas, it becomes possible that: as shown in FIG. 6, backlights having light-emitting area of various sizes are easily arranged by combining identically arranged substrates (backlight substrates 31).

Each of the backlight substrates 31 preferably has a shape similar to a shape of the light-emitting area. The light-emitting area corresponds to a display area of an image display panel, and the display area generally has a rectangular shape having a predetermined aspect ratio. Therefore, when the backlight substrate 31 has a shape similar to a shape of the display area, it becomes easy to arrange backlights having light-emitting areas corresponding to display areas of various sizes.

Further, the backlight substrate 31 preferably has a height of 81 mm and a width of 144 mm. This size makes it possible that: as shown in FIG. 7, backlights having light-emitting area substantially corresponding in size to display areas of typical sizes (13, 15, 20, 26, 32, 37, 40, 42, 45, 46, 52, 57, 58, 59, and 65 inches) are arranged by disposing an integral number of backlight substrates 31 longitudinally and transversely.

Each of the backlight substrates 31 may have a width half the aforementioned width, i.e., may have a height of 81 mm and a width of 72 mm. Alternatively, the backlight substrate 31 may have a height double the aforementioned height, i.e., may have a substantially square shape having a height of 162 mm and a width of 144 mm. Further, the backlight substrate 31 may have a height of 81 mm and a width of 48 mm. The backlight substrate 31 may have other various sizes.

Further, the foregoing description assumes that the backlight substrates 31 are disposed so as to leave no space therebetween. However, the backlight substrates 31 do not necessarily need to be disposed in such a manner. Alternatively, it is possible that the backlight substrates 31 are disposed so as to have such a space therebetween that no color unevenness occurs.

Figure 8:
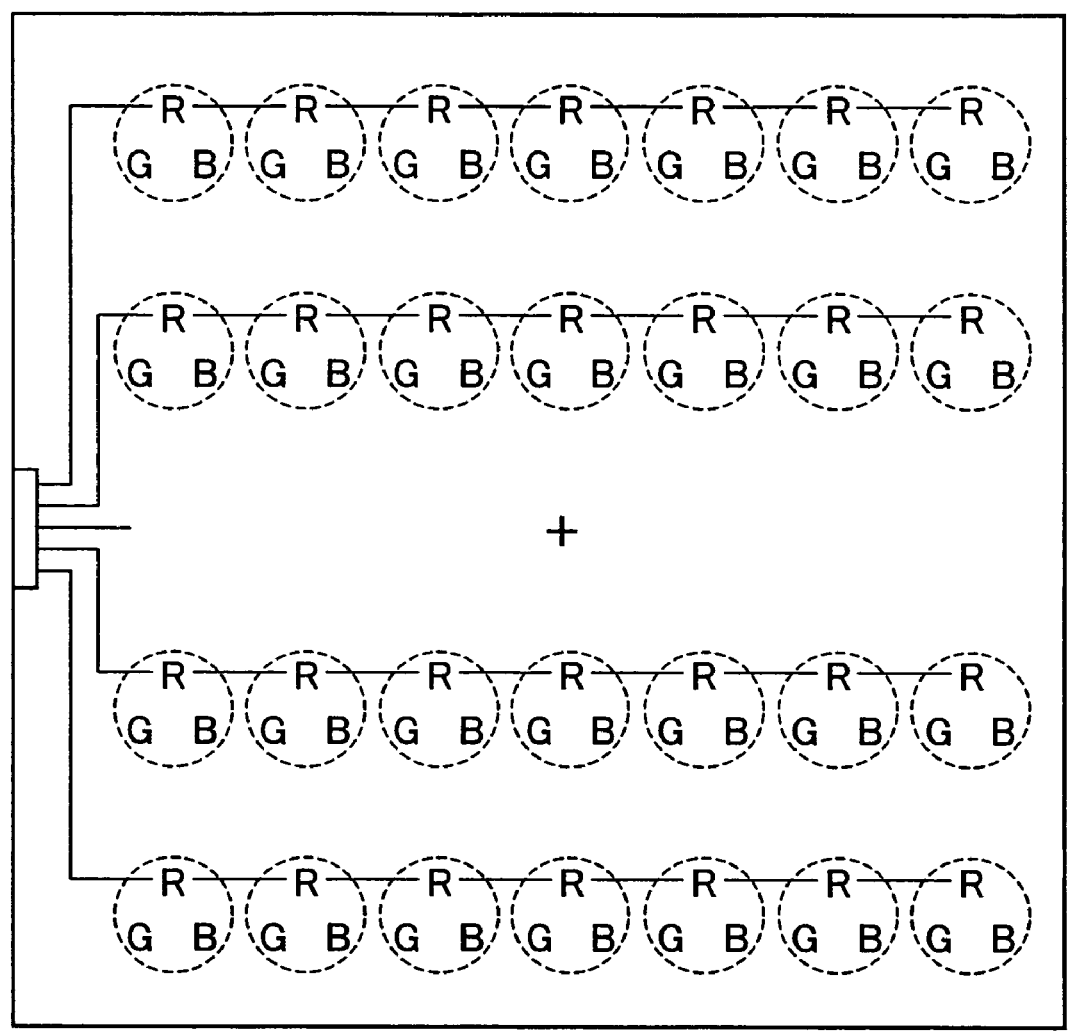
FIG. 8 is a plan view for explaining the location of a color sensor in each of the backlight substrates.

The color sensor 31a preferably detects an average light condition in each of the small areas. For that purpose, the color sensor 31a is preferably disposed in substantially the middle of the red, green, and blue LEDs mounted on each of the backlight substrates 31. Specifically, as shown in FIG. 8, the color sensor 31a is preferably provided in substantially the center of the backlight substrate 31 (i.e., in the position indicated by "+" in FIG. 8). This is realized by an arrangement in which sets of red, green, and blue LEDs (each of which sets is circled by a dotted line in FIG. 8) are disposed in a matrix manner so that: (i) the same number of sets of red, green, and blue LEDs are disposed in front of and behind the color sensor 31a in column and row directions, respectively. In cases where an odd number of sets of red, green, and blue LEDs are disposed in a column direction or in a row direction, the difference may be 1 between the numbers of sets of red, green, and blue LEDs disposed in front of and behind the color sensor 31a.

Figure 9:
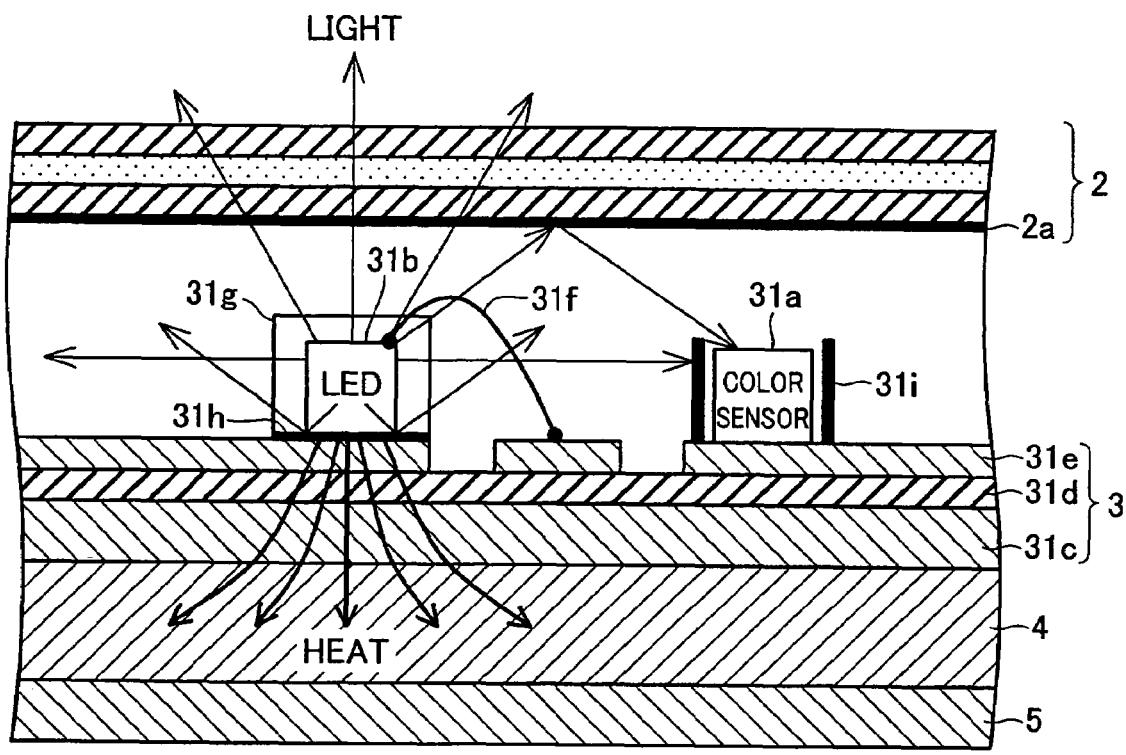
FIG. 9 is a cross-sectional view showing a liquid crystal unit, the backlight, the internal frame, and the backlight control circuit each provided in the liquid crystal display apparatus.

In the following, the backlight substrate 31 and a circuit element mounted thereon will be fully described with reference to FIG. 9. Note that FIG. 9 is a cross-sectional view of the liquid crystal unit 2, the backlight 3, the internal frame 4, and the backlight control section 5. Further, in the following, the red, green, and blue LEDs is collectively called "LED 31b" in cases where the colors respectively produced by the red, green, and blue LEDs are not particularly distinguished.

According to the arrangement shown in FIG. 9, for the purpose of minimizing an increase in temperature of the LED 31b (light-emitting section, light-emitting element, semiconductor light-emitting element), heat due to the LED 31b is efficiently diffused. Specifically, the backlight substrate 31 includes (i) a base material 31c made of a highly thermally conductive material such as aluminum, (ii) a thin (e.g., 60 μm to 80 μm) insulating layer 31d which is formed on a surface of the base material 31c and which is made of a resin and the like, and (iii) a wiring pattern 31e made of a highly thermally and electrically conductive material such as copper, the insulating layer 31d being interposed between the base material 31c and the wiring pattern 31e. Moreover, the LED 31b that is a single-wire type is mounted on the wiring pattern 31e. Furthermore, the backlight substrate 31 is provided so that a rear surface of the base material 31c has contact with the internal frame 4 made of a highly thermally conductive material such as aluminum or stainless steel.

The single-wire-type LED 31b includes a semiconductor substrate whose bottom surface serves as one electrode of the LED 31b. Therefore, the LED 31b can be electrically connected by bringing the bottom surface into direct contact with the wiring pattern 31e, so that only the other electrode formed on a surface opposite to the bottom surface of the semiconductor substrate is connected to the wiring pattern 31e by a wire 31f.

According to the foregoing arrangement, the heat due to the LED 31b can be efficiently diffused, through the highly thermally conductive wiring pattern 31e, the thin insulating layer 31d, and the highly thermally conductive base material 31c, into the internal frame 4 having high heat capacity.

Further, according to the arrangement shown in FIG. 9, the semiconductor substrate of the semiconductor light-emitting element constituting the LED 31b is made of silicon carbide (SiC), gallium nitride (GaN), or the like, and the LED 31b is sealed with a transparent resin. In case where the semiconductor substrate is made of SiC or GaN, the semiconductor substrate has a high refractive index of 3.09 (SiC) or 2.48 (GaN), although the figure may vary depending on measurement conditions. Therefore, there is a big difference in refractive index between the semiconductor substrate and the air, so that little light travels through the semiconductor substrate so as to be sent out. For this reason, in cases where the semiconductor substrate is a SiC or GaN substrate, the LED 31b is preferably sealed with a transparent resin 31g having a refractive index that lies between the refractive index of the semiconductor substrate and the refractive index of the air. (The transparent resin 31g may have a color as long as it allows transmission of light. Most transparent resins correspond to the transparent resin 31g.)

According to this arrangement, the transparent resin 31g is provided on a path of light which is emitted from a light-emitting layer of the semiconductor light-emitting element and which travels through the semiconductor substrate so as to be sent out. This allows a gradual change in refractive index on the path leading from the semiconductor substrate to the outside (air). This makes it possible to take out more light from the path, so that the light can be used more efficiently.

Further, when the LED 31b is sealed with the transparent resin 31g, the LED 31b can be protected from accidental mechanical contact during assembly and inspection regardless of the refractive index of the semiconductor substrate.

Figure 10:
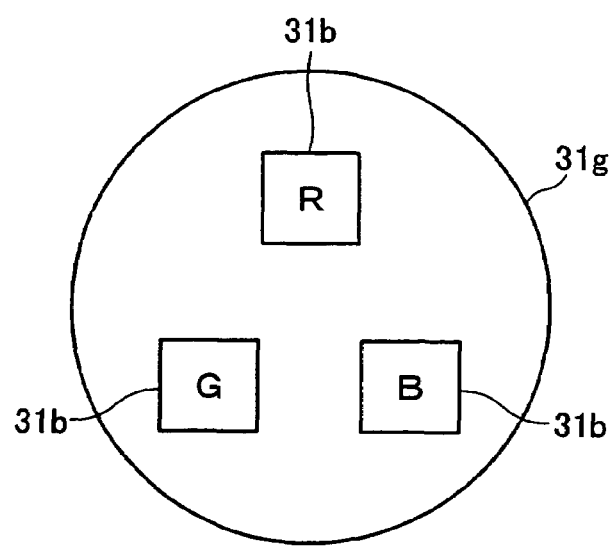
FIG. 10 is a plan view showing red, green, and blue LEDs sealed with a resin.

The LED 31b may be sealed one by one with the transparent resin 31g. However, as shown in FIG. 10, one or more sets of red, green, and blue LEDs may be sealed together. However, when too many sets of red, green, and blue LEDs are sealed together, a large portion of the backlight substrate 31 is covered with the transparent resin 31g. In this case, the transparent resin 31g may peel from the backlight substrate 31 because of a difference in expansion rate between the backlight substrate 31 and the transparent resin 31g. Therefore, it is preferable that a set of red, green, and blue LEDs be sealed together.

Further, according to the arrangement shown in FIG. 9, a surface on which the LED 31b is mounted is covered with silver plating 31h.

According to this arrangement, the light which is emitted from the light-emitting layer of the semiconductor light-emitting element and which travels through the semiconductor substrate so as to be sent out to the surface on which the semiconductor light-emitting element is mounted can be efficiently reflected by the silver plating 31h. Therefore, the light which is sent out to the surface on which the semiconductor light-emitting element is mounted becomes able to be taken out efficiently, so that the light can be used more efficiently.

See a case where the semiconductor light-emitting element has a substrate which is a crystal substrate made of sapphire or the like. Also in such a case, when the surface on which the semiconductor light-emitting element is mounted is covered with the silver plating 31h, it is possible to efficiently reflect, with the use of the silver plating 31h, the light which is emitted from the light-emitting layer of the semiconductor light-emitting element and which travels through the crystal substrate so as to be sent out to the surface on which the semiconductor light-emitting element is mounted. Therefore, the provision of the silver plating 31h is effective also in cases where the semiconductor light-emitting element has a substrate which is a crystal substrate made of sapphire or the like.

Further, the silver plating 31h is also preferably covered with the transparent resin 31g. With this, oxidization of the silver plating 31h can be prevented, and the silver plating 31h can retain its high reflectance for a long period of time. For the purpose of preventing oxidization, the silver plating 31h may be made of silver alloy instead of pure silver.

Furthermore, the backlight substrate 31 preferably has a surface subjected to a reflectance improving process. The reflectance improving process refers to a process of improving a light reflectance of the surface of the backlight substrate 31, and is realized, for example, by (i) applying a white resin onto the surface of the backlight substrate 31 or (ii) pasting a high-reflectance sheet to the surface of the backlight substrate 31. For the purpose of not inhibiting the LED 31b and the color sensor 31a from being electrically connected to the wring pattern 31e formed on the backlight substrate 31, the application of the white resin or the pasting of the high-reflectance sheet is carried out so that respective mounting positions of the LED 31b and the color sensor 31a are exposed. Since the backlight substrate 31 becomes hot, it is preferable that a heat-resistant white resin be used in cases where the application of the white resin is carried out.

According to this arrangement, the intensity of light that is to be lost in the backlight substrate 31 is reduced. This makes it possible that the light emitted from the LED 31b is used more efficiently.

Further, according to the arrangement shown in FIG. 9, the color sensor 31a includes a light-shielding section 31i for preventing the light emitted from the LED 31b from being directly incident on the color sensor 31a.

According to this arrangement, the light emitted from the LED 31b falls indirectly on the color sensor 31a (e.g., light diffused, for example, by the liquid crystal unit 2, especially a diffusion plate 2a provided in the liquid crystal unit 2, falls on the color sensor 31a), it becomes possible to detect light similar to light observed via the liquid crystal unit 2.

According to the present embodiment, the red, green, and blue LEDs are used as the light-emitting elements that are to be mounted on the backlight substrate 31. However, part or all of the light-emitting elements may be replaced by a light-emitting element that emits light of a predetermined color by using a combination of (i) a light source such as an LED and (ii) a luminescent material which absorbs light emitted from the light source and which emits light having a wavelength longer than that of the light emitted from the light source.

Further, concrete examples of the light-emitting elements that are to be mounted on the backlight substrate 31 are as follows. Examples of the green and blue light-emitting elements include: (i) a GaN light-emitting element mounted on a sapphire substrate; (ii) a GaN light-emitting element mounted on a SiC substrate; and (iii) an element obtained by pasting, to another member (e.g., Si), a GaN light-emitting layer which has grown on a SiC substrate and which has been peeled away from the SiC substrate. Examples of the red light-emitting element include: (a) an AlGaInP light-emitting element mounted on a GaAs substrate; and (b) an element obtained by pasting, to another member (e.g., Si), an AlGaInP light-emitting layer which has grown on a GaAs substrate and which has been peeled away from the GaAs substrate.

Figure 11:
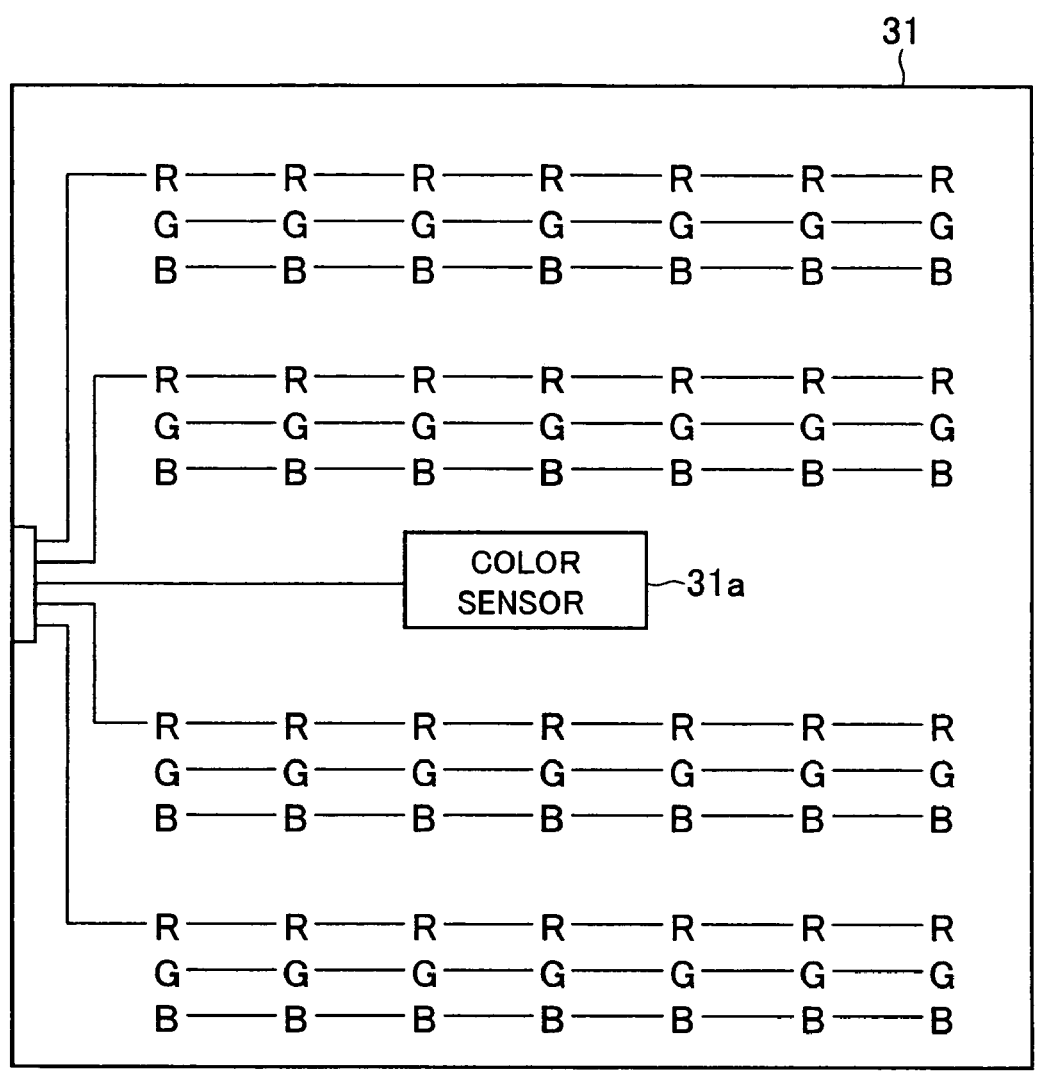
FIG. 11 is a plan view showing an example of the configuration of red, green, and blue LEDs.

Further, the red, green, and blue LEDs may be disposed on the backlight substrate 31 in various ways. For example, as shown in FIG. 3, sets of red, green, and blue LEDs are disposed. For example, as shown in FIG. 11, lines of red LEDs, lines of green LEDs, and lines of blue LEDs are disposed.

Embodiment 2 of the First Invention

Figure 12:
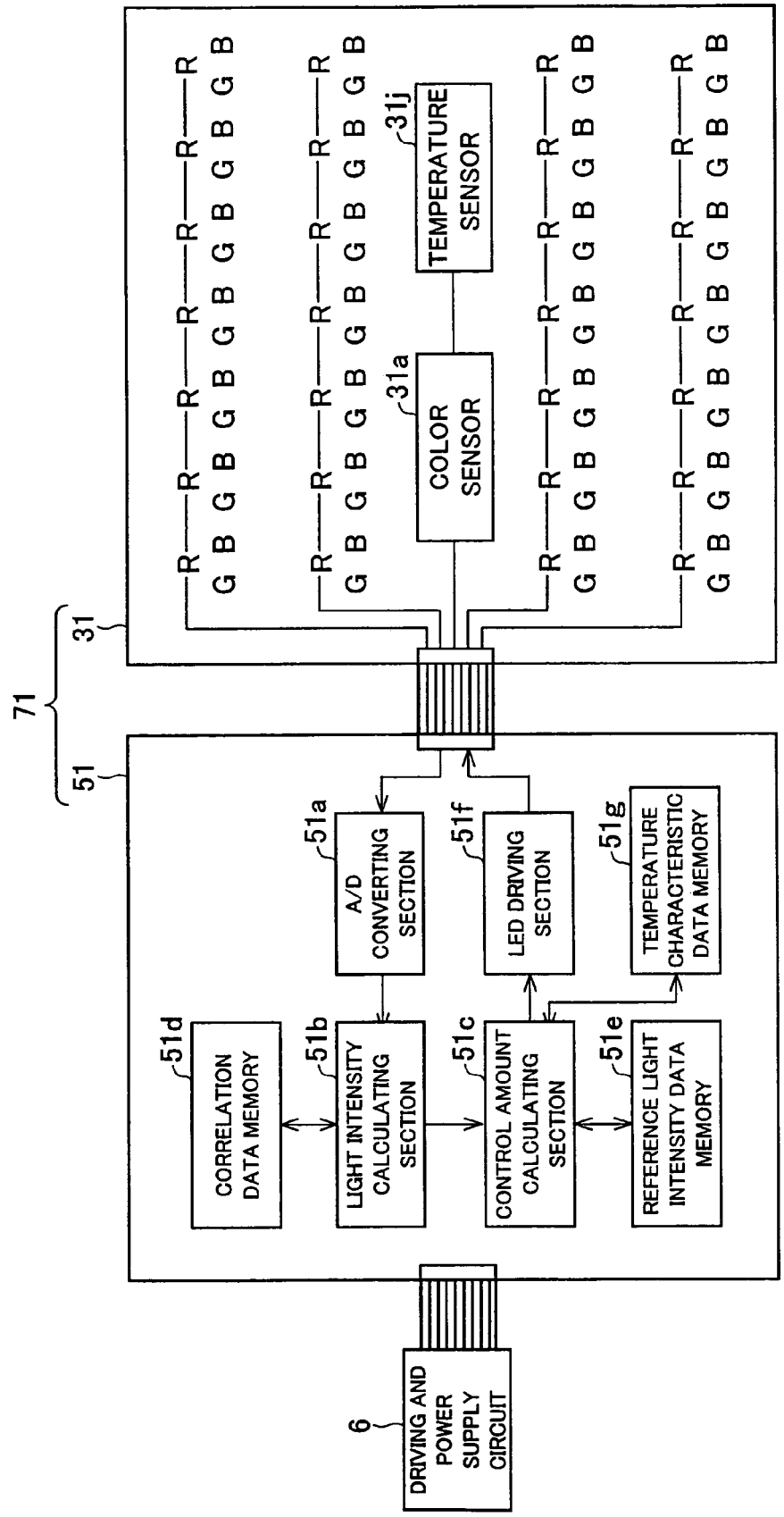
FIG. 12 is a plan view showing an arrangement of a backlight unit provided in a liquid crystal display apparatus of Embodiment 2 of the First Invention.

Embodiment 2 of the present invention will be described below with reference to FIG. 12.

The main differences between the present embodiment and Embodiment 1 described above are as follows: (1) the present embodiment has a temperature sensor 31a added to the backlight substrate 31; (2) the present embodiment has a temperature characteristic data memory 51g added to the control substrate 51; and (3) the functional blocks provided on the control substrate 51 carry out control in accordance with (i) a detection result obtained by the color sensor 31a and (ii) a detection result obtained by the temperature sensor 31j.

Therefore, the following description centers on the differences described above. Note that components having the same functions as those corresponding to the components of Embodiment 1 are given the same reference numerals.

The backlight substrate 31 has the temperature sensor 31j mounted thereon. The temperature sensor 31j detects a temperature of a position, where the temperature sensor 31j is mounted, of the backlight substrate 31, and outputs a signal indicating the detected temperature.

The analog signal (the signal indicating the detected temperature) sent from the temperature sensor 31j is converted into a digital signal by the A/D converting section 51a. The digital signal is sent to the control amount calculating section 51c.

First, the control amount calculating section 51c calculates a control amount corresponding to the detected temperature. The calculation is carried out in accordance with (i) the temperature detected by the temperature sensor 31j, (ii) temperature characteristic data concerning the red, green, and blue LEDs and stored in the temperature characteristic data memory 51g. Then, the control amount calculating section 51c outputs a signal indicative of the control amount to the LED driving section 51f.

Note that the temperature characteristic data stored in the temperature characteristic data memory 51g is data which indicates control amounts correlated to various detected temperatures. Respective luminescence properties of the red, green, and blue LEDs change in accordance with respective temperatures of the red, green, and blue LEDs, and the respective luminescence properties of the red, green, and blue LEDs changes to various degrees. In view of this, control amounts (current values in cases where driving is carried out using current signals; pulse widths in cases where driving is carried out using PWM signals) serving as references for the red, green, and blue LEDs are pre-calculated with respect to various temperatures, and are stored as the temperature characteristic data in the temperature characteristic data memory 51g. By carrying out control, as described above, with the use of the temperature characteristic data, the red, green, and blue LEDs can be set to respectively have approximate desired light intensities.

Then, as is the case for Embodiment 1, the control amount calculating section 51c makes a comparison between (i) the respective predicted light intensities of the red, green, and blue LEDs as specified by the light intensity calculating section 51b and (ii) the reference light intensity data stored in the reference light intensity data memory 51e. The control amount calculating section 51c calculates a control amount for matching the respective light intensities of the red, green, and blue LEDs to the reference light intensities. The control amount calculating section 51c outputs a signal indicative of the control amount to the LED driving section 51f. This makes it possible to more accurately control the respective light intensities of the red, green, and blue LEDs.

As described above, in the present embodiment, the backlight substrate 31 includes the temperature sensor 31j for detecting a temperature of the substrate. Furthermore, the respective light intensities of the red, green, and blue LEDs mounted on the backlight substrate 31 are controlled in accordance with the detection result obtained by the temperature 31j mounted on the substrate.

This arrangement makes it possible to control the respective light intensities of the red, green, and blue LEDs in consideration of the fact that respective light-emitting states of the red, green, and blue LEDs change due to a change in the temperature of the backlight substrate 31.

The backlight substrate 31 may include a nonvolatile memory (e.g., a ROM) storing respective characteristics of the red, green, and blue LEDs mounted on the substrate. The red, green, and blue LEDs have light intensities that decrease as the temperature increases, and produce colors (i.e., have luminescence wavelengths) that change as the temperature increases. The light intensity and color of one of the red, green, and blue LEDs change differently from those of another one of the red, green, and blue LEDs. (This is attributed, for example, to (i) variations between manufactures, (ii) variations between lots, and (iii) variations within a lot.) In view of this, information concerning such differences in characteristic (a) is acquired by carrying out preliminary inspection, (b) is stored in the nonvolatile memory, and (c) is referred to when the aforementioned control is carried out. This makes it possible to carry out control more accurately.

As described above, a backlight device according to the present invention is a backlight device which is a direct type and which is used for a non-self-luminous image display panel, the backlight device, including: a light-emitting area corresponding to a display area of the image display panel, the light-emitting area including a plurality of small areas each of which is provided with (i) a light detecting section for detecting an intensity of light incident thereon and (ii) one or more light-emitting sections whose respective light intensities are controlled in accordance with a detection result obtained by the light detecting section.

With the foregoing arrangement, in each of the plurality of small areas constituting the light-emitting area, the light detecting section detects an intensity of light incident thereon. In accordance with the detection result obtained by the light detecting section, the respective light intensities of the light-emitting sections disposed in the small area are controlled.

Therefore, with the foregoing arrangement, it is possible to divide the light-emitting area into the small areas and to adjust the light intensities for each of the small areas.

As a result, it becomes possible to make an adjustment so that brightness unevenness is suppressed for each of the small areas constituting the light-emitting area. This makes it possible to reduce brightness unevenness entirely in the light-emitting area.

In the foregoing arrangement, the backlight device according to the present invention is preferably arranged so that: the light detecting section detects respective light intensities of a plurality of color components; and the light-emitting sections have the light intensities that are controlled for a plurality of color components.

With the foregoing arrangement, the light detecting section detects the respective light intensities of the plurality of color components, and the light-emitting sections have the light intensities that are controlled for the plurality of color components, respectively.

Therefore, the foregoing arrangement makes it possible to not only adjust the light intensities in each of the small areas but also adjust a color of light that is emitted in the small area.

This makes it possible to reduce color unevenness as well as uneven brightness.

In the foregoing arrangement, for the purpose of carrying out the foregoing control, it is only necessary to provide a control section for controlling the respective light intensities of the light-emitting sections in accordance with the detection result obtained by the light detecting section.

In the foregoing arrangement, the backlight device according to the present invention is preferably arranged so as to include substrates each of which includes the light detecting section and the light-emitting sections thereon and which are divided so as to respectively correspond to the plurality of small areas.

According to the foregoing arrangement, since (i) the light detecting section and (ii) the light-emitting sections that are controlled in accordance with the detection result obtained by the light detecting section are mounted on each of identical substrates, backlight devices having light-emitting areas of various sizes can be easily arranged by combining the substrates.

In the foregoing arrangement, the backlight device according to the present invention is preferably arranged so that each of the substrates has a shape similar to a shape of the light-emitting area.

A display area of an image display panel generally has a rectangular shape having a predetermined aspect ratio. Therefore, when the substrate has a shape similar to a shape of the display area, it becomes easy to arrange backlights having light-emitting areas corresponding to display areas of various sizes.

In the foregoing arrangement, the backlight device according to the present invention is preferably arranged so that the substrate has dimensions of 81 mm×144 mm.

By combining substrates of the foregoing size, it is possible to arrange backlight devices having light-emitting area substantially corresponding in size to display areas of typical sizes (13, 15, 20, 26, 32, 37, 40, 42, 45, 46, 52, 57, 58, 59, and 65 inches).

In the foregoing arrangement, the backlight device according to the present invention is preferably arranged so that: the plurality of light-emitting sections are disposed in a matrix manner in each of the small areas, and the light detecting section is provided in the small area so as to be positioned such that: (i) a number of light-emitting sections disposed in front of the light detecting section in a column direction is equal to or different by one from a number of light emitting sections disposed behind the light detecting section in the column direction; and (ii) a number of light-emitting sections disposed in front of the light detecting section in a row direction is equal to or different by one from a number of light emitting sections disposed behind the light detecting section in the row direction.

According to the foregoing arrangement, in each of the small areas, the light detecting section is located substantially in the middle of the plurality of light-emitting sections disposed in a matrix manner. Therefore, it becomes possible to detect an average light intensity of each of the small areas by using the light detecting section. This enables a more appropriate adjustment.

In the foregoing arrangement, the backlight device according to the present invention is preferably arranged so that: the substrate has a surface, including the light-emitting sections thereon, which surface has been subjected to a reflectance improving process. The reflectance improving process refers to a process of improving a light reflectance of the surface of the substrate, and is realized, for example, by (i) applying a white resin onto the surface of the substrate or (ii) pasting a high-reflectance sheet to the surface of the substrate.

According to the foregoing arrangement, the intensity of light that is to be lost on the surface of the substrate is reduced. This makes it possible that the light emitted from the light-emitting sections is used more efficiently.

In the foregoing arrangement, the backlight device according to the present invention is preferably arranged so that: each of the light-emitting sections includes three types of light-emitting element that emit red, green, and blue light, respectively.

According to the foregoing arrangement, brightness and/or color can be adjusted by controlling respective outputs of the three types of light-emitting element.

Note that at least one of the three types of light-emitting element includes (i) a light source and (ii) a luminescent material which absorbs light emitted from the light source and which emits light having a wavelength longer than a wavelength of the light emitted from the light source.

In the foregoing arrangement, the backlight device according to the present invention is preferably arranged so that: at least one of the three types of light-emitting element is a semiconductor light-emitting element formed by using a semiconductor substrate made of silicon carbide or gallium nitride, and is sealed with a transparent resin having an index of refraction which lies between an index of refraction of the semiconductor substrate and an index of refraction of air.

According to the foregoing arrangement, the transparent resin lies on a path of light which is emitted from a light-emitting layer of the semiconductor light-emitting element and which is sent out after traveling through the semiconductor substrate. This allows a gradually change in refractive index on the path leading from the semiconductor substrate to the outside (air). This makes it possible to take out more light from the path, so that the light can be used more efficiently.

In the foregoing arrangement, the backlight device according to the present invention is preferably arranged so that a surface on which the semiconductor light-emitting element is mounted is plated with silver.

According to the foregoing arrangement, the light which is emitted from the light-emitting layer of the semiconductor light-emitting element and which is sent to the surface on which the semiconductor light-emitting element is mounted can be efficiently reflected by the silver plating. Therefore, the light which is sent to the surface on which the semiconductor light-emitting element is mounted becomes able to be taken out efficiently, so that the light can be used more efficiently.

In the foregoing arrangement, the backlight device according to the present invention is preferably arranged so that the light detecting section includes a light-shielding section for preventing light emitted from the light-emitting sections from being directly incident on the light detecting section.

According to the foregoing arrangement, the light emitted from the light-emitting sections falls indirectly on the light detecting section (e.g., light diffused, for example, by the image display panel or a diffusion plate provided in the image display panel falls on the light detecting section), it becomes possible to detect light in a manner more similar to observation via the image display panel.

In the foregoing arrangement, the backlight device according to the present invention is preferably arranged so that: each of the substrates has a temperature detecting section for detecting a temperature of the substrate, and the light-emitting sections mounted on the substrate have the respective light intensities that are further controlled in accordance with a detection result obtained by the temperature sensor mounted on the substrate.

According to the arrangement, it becomes possible to control the respective light intensities of the red, green, and blue LEDs in consideration of the fact that respective light-emitting states of the red, green, and blue LEDs change due to a change in the temperature of the substrate.

A display apparatus according to the present invention is arranged so as to include: any one of the foregoing backlight devices; and a non-self-luminous image display panel for displaying an image by controlling a transmission state of light emitted from the backlight device.

With the foregoing arrangement, it is possible to reduce brightness unevenness on a display screen.

The present invention can be applied to a direct-type backlight device used for a non-self-luminous image display panel such as a liquid crystal panel.

The present invention is not limited to the description of the embodiments above, but may be altered by a skilled person within the scope of the claims. An embodiment based on a proper combination of technical means disclosed in different embodiments is encompassed in the technical scope of the present invention.

Embodiment 1 of the Second Invention

Figure 13:
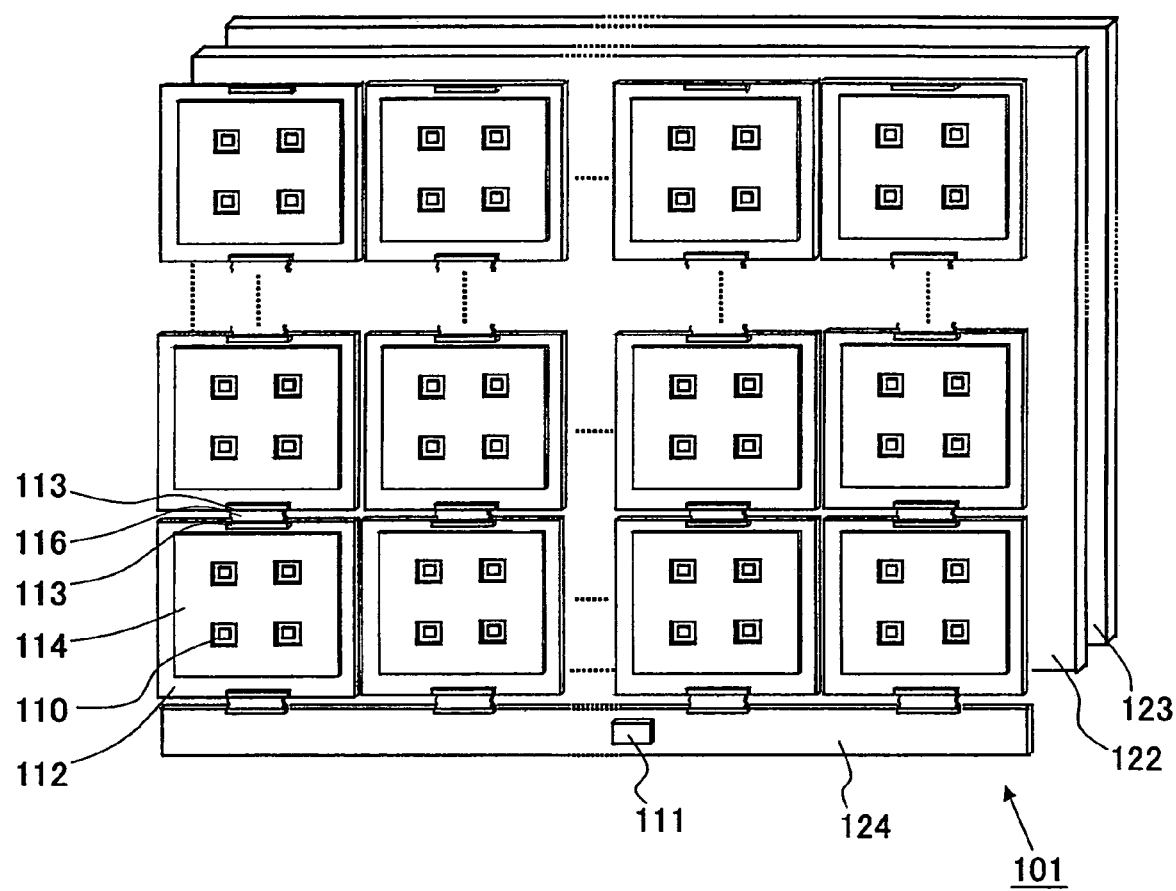
FIG. 13 is a diagram schematically showing a rear surface of a liquid crystal display apparatus of Embodiment 1 of the Second Invention.

FIG. 13 is a diagram schematically showing a rear side of a liquid crystal display apparatus 101 of the present embodiment. Each of a plurality of tiles 112 has a front side on which a plurality of LED chips 104 (described later because they are not shown in FIG. 13) serving as light-emitting elements are assembled. Light emitted from the LED chips 104 is uniformed by a diffusion plate 122 and illuminates a liquid crystal panel 123 disposed outside of the diffusion plate 122, so that an image can be displayed. The number of tiles 112 to be arranged longitudinally and transversely can be freely determined depending on a screen size of an LCD television. The present embodiment assumes that: each of the tiles 112 has an aspect ratio of 8:9, and 8×4 (8 tiles 112 wide by 4 tiles 112 high) tiles 112 are disposed so as to be suitable for an HDTV screen having an aspect ratio of 16:9. The backlight device, disclosed in WO 00/037904 (published on Jun. 29, 2000), which uses a waveguide plate has a backlight area that is not essentially divided, so that it is difficult to divide, into four or more, a display area corresponding to a sensor. On the other hand, since the present embodiment can be divided into an arbitrary number of tiles, the present embodiment is suitable for a large backlight device. In the display apparatus, the liquid crystal panel 123 can be replaced by a non-self-luminous image display panel other than a liquid crystal panel. Examples of the non-self-luminous image display panel include an MEMS (microelectromechanical system) panel and a shutter panel using an electrooptic or electrophoretic effect.

Each of the tiles 112 has four sides, i.e., two opposite pairs of sides. Two opposite sides of one of the two opposite pairs of sides are respectively provided with connectors 113 for connecting the plurality of tiles 112. A connector 113 of one tile 112 is connected to a connector 113 of another tile 112 by a cable 116. In this way, each of the tiles 112 is connected to a control substrate 124.

The control substrate 124 is provided with a microcomputer 111. The microcomputer 111 serves as a control circuit for transmitting, to integrated circuit elements 110 of the tile 112, signals based on which LED driving is carried out.

Figure 14:
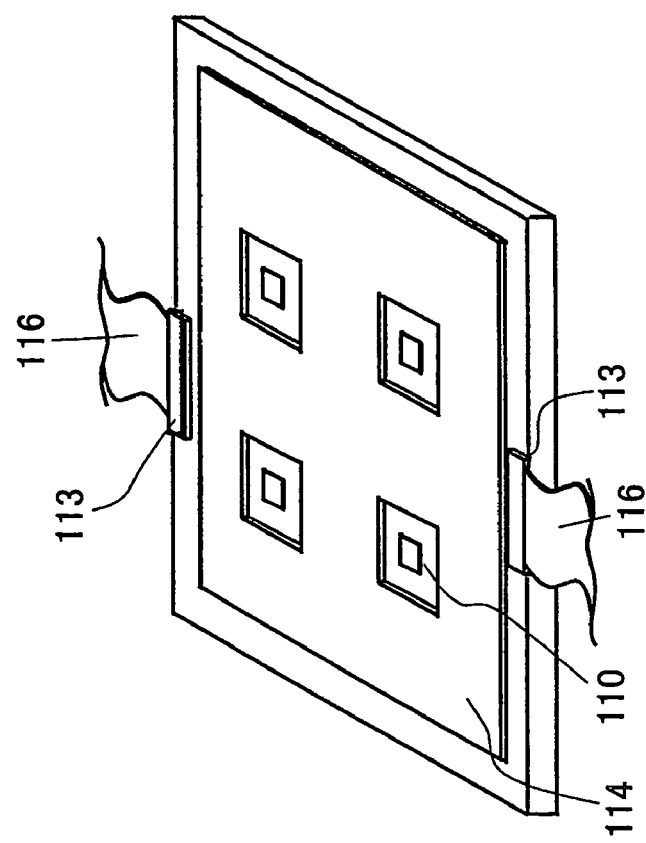
FIGS. 14(a) and 14(b) are diagrams schematically showing a tile provided in a backlight device of Embodiment 1 of the Second Invention.
Figure 14:
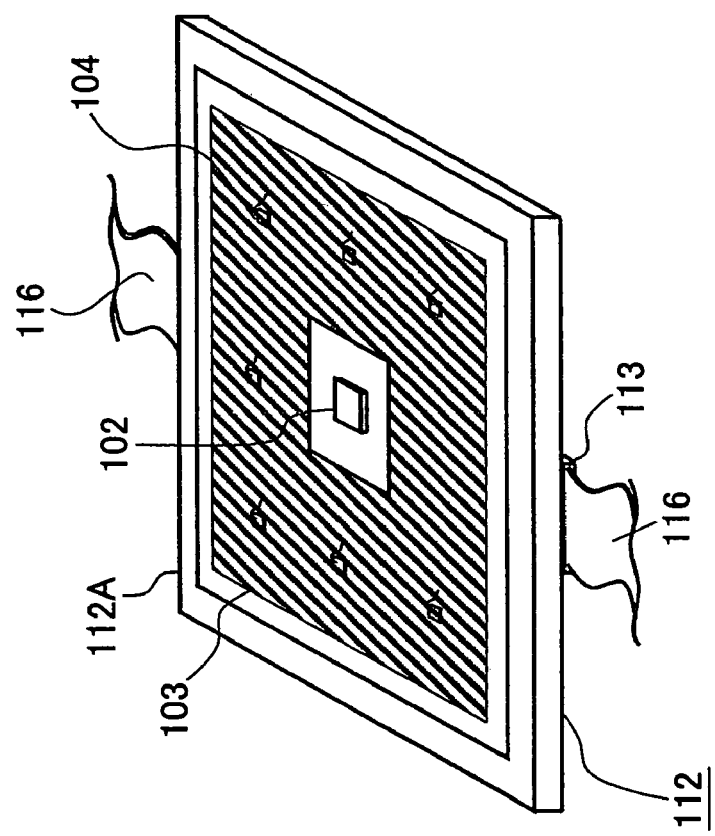

FIG. 14(a) shows a surface of the tile 112. The tile 112 includes a base substrate 112A made of glass epoxy, so that multilayer wiring is possible. Provided in the center of the surface is a light sensor 102 made up of three photodiodes that respectively detect red, green, and blue. The light sensor 102 is surrounded by an LED configuration region 103 in which a plurality of red LED chips, a plurality of green LED chips, and a plurality of blue LED chips are die-bonded (the red, green, and blue LEDs being collectively called "LED chips 104). By thus disposing the light sensor 102 in the center of the tile 112, the light sensor 102 is not much affected by light emitted from neighboring tiles. Therefore, closed-loop feedback control can be carried out between the light sensor 102 and the LED chips 104 inside the tile 112.

As shown in FIG. 14(b), the tile 112 has a rear surface on which the integrated circuit elements 110 have been mounted. Each of the integrated circuit elements 110 is connected to the outside via a connector 113 and a cable 116. Further, a radiator plate 114 is provided so that a part where the integrated circuit element 110 has been disposed is exposed.

Figure 15:
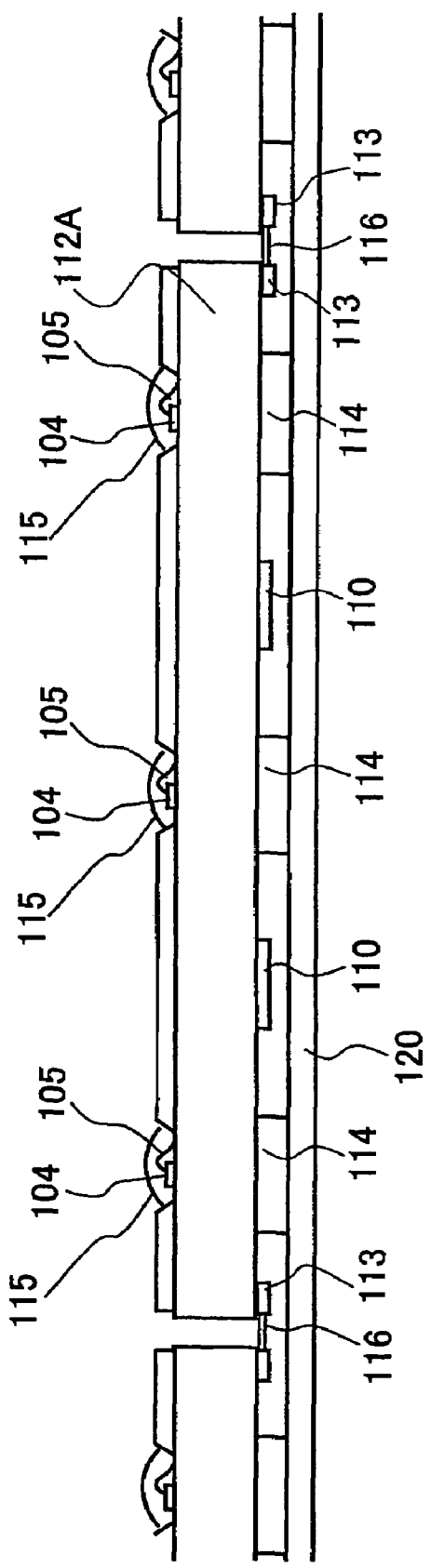
FIG. 15 is a cross-sectional view of the tile provided in the backlight device of Embodiment 1 of the Second Invention.

FIG. 15 is a cross-sectional view of the tile 112. As shown in FIG. 15, on a surface of the base substrate 112A, (i) an electrode pad (not shown) of each of the plurality of LED chips 104 and (ii) a wiring pad provided in the tile 112 are wire-bonded by a gold wire 105 so as to be electrically connected to each other. The LED chip 104 and the gold wire 105 are sealed with a transparent sealing resin 115. The radiator plate 114 is mounted on a rear surface of the base substrate 112A opposite the LED chip 104. The radiator plate 114 has contact with a chassis 120 constituting part of the display apparatus (unit), so that heat is radiated efficiently from the chassis 120. The rear surface of the base substrate 112A has places which do not have contact with the radiator plate 114 and on which the integrated circuit elements 110 have been respectively mounted. Further, the rear surface of the base substrate 112A has two opposite sides on which the connectors 113 have been respectively disposed.

Figure 16:
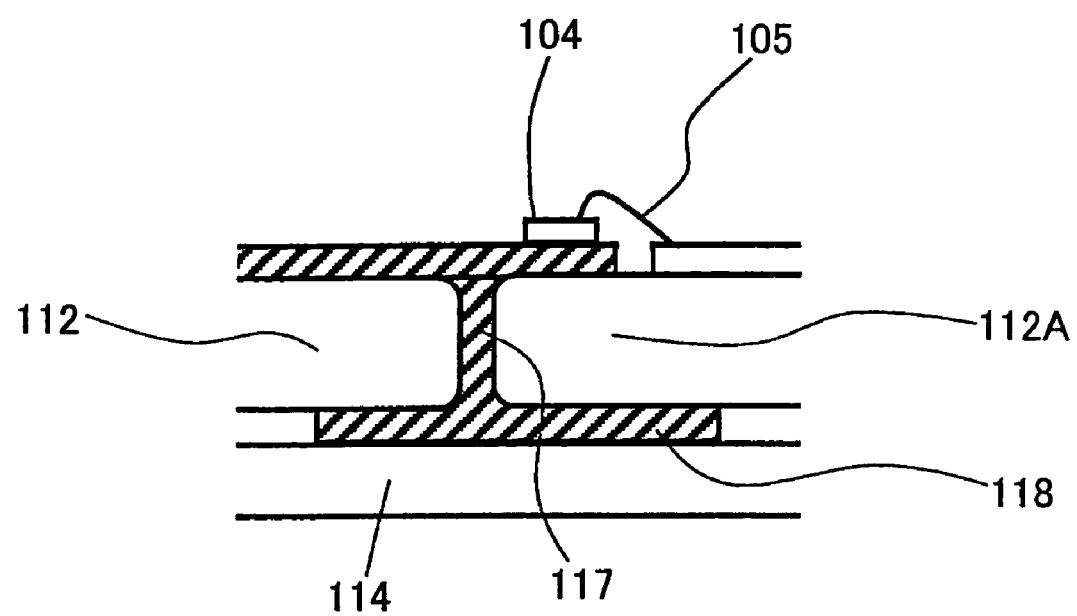
FIG. 16 is an enlarged sectional view of the tile provided in the backlight device of Embodiment 1 of the Second Invention.

FIG. 16 is an enlarged sectional view of the vicinity of a part where the LED chip 104 has been die-bonded on the base substrate 112A. Provided beneath a region where the LED chip 104 has been die-bonded is a through hole 117. A wire 118 leads from the part where the LED chip 104 has been die-bonded, and reaches the rear surface of the base substrate 112A via the through hole 117. The wire 118 is made of a highly thermally conductive metal such as copper, and is structured so as to have contact with the radiator plate 114. This brings about a high effect of radiating heat generated by the LED chip 104.

The present embodiment uses glass epoxy as a material of the base substrate 112A. This enables multilayer wiring, so that the tile 112 becomes free from wiring restrictions. This makes it possible to ensure a degree of freedom in terms of LED chip wiring. Since complex wiring becomes possible, it becomes easy to mount the integrated circuit elements 110 on the tile 112.

Note that some or all of the red, green, and blue LEDs used in the present embodiment may be replaced, for example, as follows. That is, each of the red LEDs may be replaced by a combination of (i) a blue LED and (ii) a luminescent material that absorbs light emitted from the blue LED and emits red light. Further, each of the green LEDs may be replaced by a combination of (a) a blue LED and (b) a luminescent material that absorbs light emitted from the blue LED and emits green light. Further, it is possible to use a combination of (I) an LED that emits ultraviolet light and (II) luminescent materials that respectively emit red, green, and blue light.

Further, the present embodiment describes an example in which the red, green, and blue LEDs are used as the light-emitting elements and in which chromaticity and luminance are uniformed. However, for example, white LEDs may be used as the light-emitting elements. In such a case, it becomes unnecessary to carry out control concerning chromaticity, so that only control concerning luminance is carried out. Examples of each of the white LEDs may include a combination of a normal red LED and a yellow luminescent material. However, preferred examples of the white LED include the aforementioned combination of a blue LED and red and green luminescent materials or the aforementioned combination of an ultraviolet LED and red, green, and blue luminescent materials.

(Circuit Arrangements and Operation of a Backlight Device in Embodiment 1 of the Second Invention)

Figure 17:
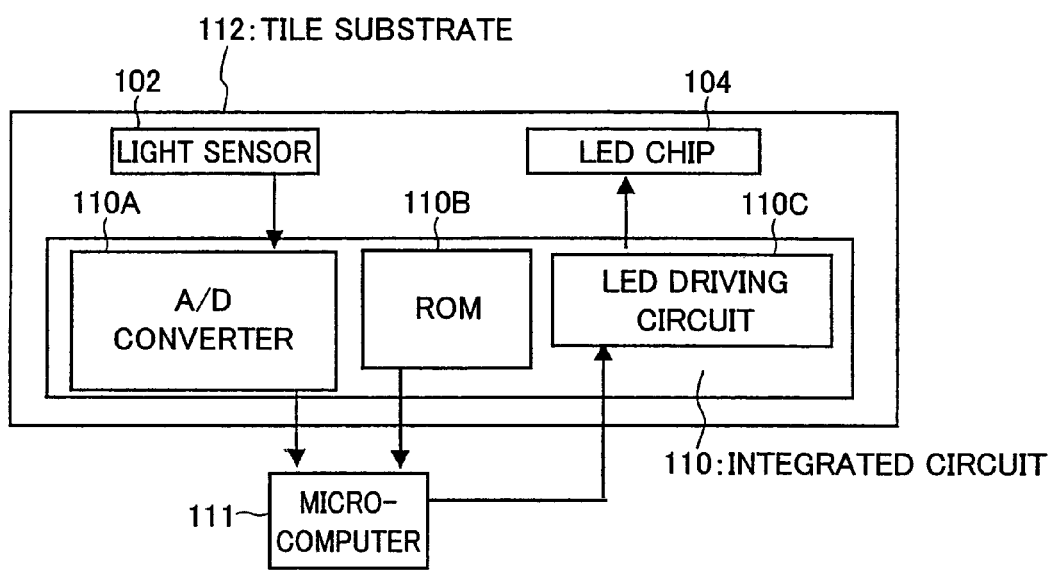
FIGS. 17(a) and 17(b) are diagrams schematically showing a flow of signals of Embodiment 1 of the Second Invention.
Figure 17:
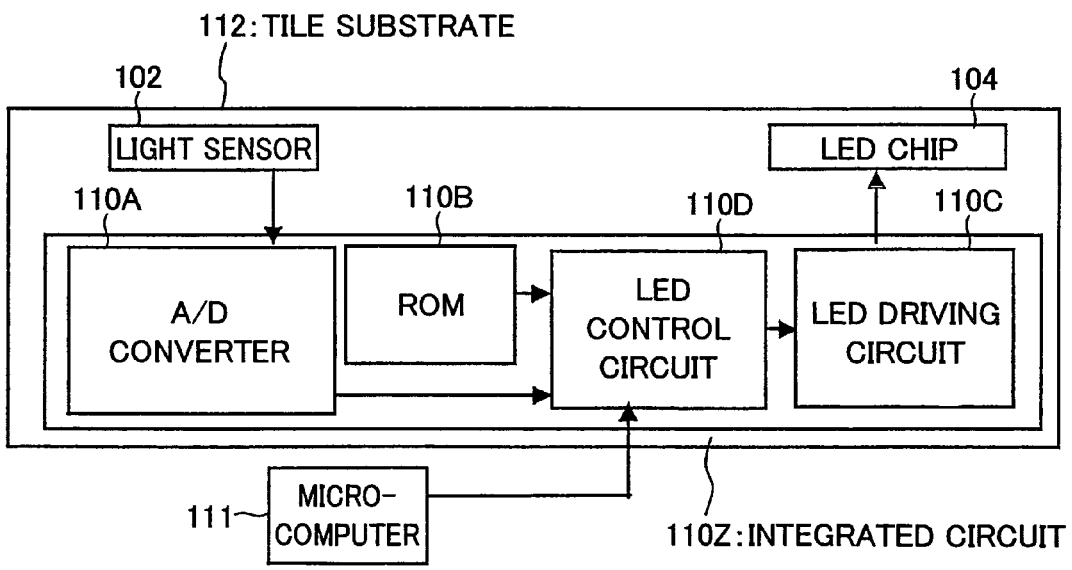

FIG. 17(a) is a diagram schematically showing a circuit arrangement. Mounted in the tile 112 are the light sensor 102, the LED chips 104, and the integrated circuit elements 110 (each of the integrated circuit elements 110 being made up of an A/D converter 110A, a rewritable ROM 110B, and an LED driving circuit 110C). The light sensor 102 is a light sensor covering a set made up of a photodiode having a red filter, a photodiode having a green filter, and a photodiode having a blue filter. The light sensor 102 detects respective light intensities of the red, green, and blue LED chips 104 provided in the tile 112. Then, the light sensor 102 transmits, to the A/D converter 110A, an analog signal corresponding to the light intensities. The A/D converter 110A converts the analog signal into a digital signal.

The rewritable ROM 110B stores an output value (hereinafter referred to as "light sensor reference value") produced by the light sensor 102 in cases where the LED chips 104 emit light having a predetermined chromaticity and a predetermined luminance (the storage method will be described later).

The backlight device operates as follows. That is, when the LED chips 104 provided in each of the tiles 112 constituting the backlight device are driven, the light sensor 102 detects chromaticity and luminance within the tile 112, and (i) an output value of the light sensor 102 and (ii) the light sensor reference value stored in the rewritable ROM 110B are sent to the microcomputer 111 provided outside of the tile 112.

The microcomputer 111 is used commonly for all the tiles 112. The microcomputer 111 makes a comparison between (i) the output value of the light sensor 102 and (ii) the light sensor reference value stored in the rewritable ROM 110B, and standardizes the output value of the light sensor 102. The standardization is carried out, for example, by carrying out a calculation according to which the ratio between (i) the output value of the light sensor 102 and (ii) the light sensor reference value is obtained by dividing (i) the output value of the light sensor 102 by (ii) the light sensor reference value. The microcomputer 111 generates such a control signal that the standardized light sensor output thus obtained approximates to a set value (chromaticity and luminance set by a viewer of the liquid crystal display apparatus), and transmits the control signal to the LED driving circuit 110C provided in the integrated circuit element 110.

The LED driving circuit 110C controls, in accordance with the control signal, the pulse width of a PWM (pulse width modulation) driving current that is to be supplied to the LED chips 104. The present embodiment produces the PWM output with an electrical current value held constant, but it is possible to change luminance or chromaticity by changing the electrical current value. Further, the PWM driving output may be replaced by an analog output (an electrical current value at which a required light intensity is obtained).

The microcomputer 111 mounted in the control substrate 124 sends the control signal to the plurality of tiles 112 in a time-sharing manner. The reason for this is that: the chromaticity and luminance of the backlight are adjusted mainly for the purpose of making corrections with respect to temperature changes or moment-to-moment changes, and it is not necessary to continuously transmit the control signal.

By carrying out such an operation, feedback control of matching the output value of the light sensor 102 to the set value is carried out. Since the feedback control is carried out so that a standardized light sensor output of each tile becomes constant, the chromaticity and luminance of light-emitting elements of one tile may be different from the chromaticity and luminance of light-emitting elements of another tile. For example, a light sensor of a tile disposed in a central portion of the backlight device receives much light from neighboring tiles. For this reason, the luminance of light-emitting elements of the tile is suppressed so that a standardized light sensor output of the tile becomes constant. In this way, the backlight device operates so that uniform luminance is obtained entirely in the backlight device.

According to the foregoing operation, the backlight device constantly emits white light having a certain set value. However, a feedback operation can be carried out also in cases where the set value varies. For example, it is possible to make an adjustment in accordance with a video signal used for liquid crystal display. A set value, for obtaining white light, corresponding to the standardized light sensor output is normally R:G:B=1:1:1. On the other hand, a set value, for displaying a dark image as a whole, corresponding to the standardized light sensor output is R:G:B=0.2:0.2:0.2. Alternatively, it is possible to carry out an operation for adjusting chromaticity as well as luminance. For example, in cases where a blue image (e.g., an image of the sea) is displayed by using the tiles 112 of the liquid crystal display apparatus, it is possible to carry out such an operation that the standardized light sensor output is set at R:G:B=0.1:0.2:1.0.

Further, as shown in FIG. 14(b), the plurality of integrated circuit elements 110 are mounted on the tile 112. However, it is not necessary that all the integrated circuit elements 110 are identical. For example, one of the integrated circuit elements 110 may be made up of the A/D converter 110A, the rewritable ROM 110B, and the LED driving circuit 110C, and each of the remaining integrated circuit elements 110 may be made up of an LED driving circuit 110C.

FIG. 17(b) is a diagram schematically showing a flow of signals in another arrangement. Mounted in the tile 112 are the light sensor 102, the LED chips 104, and integrated circuit elements 110Z (each of the integrated circuit elements 110Z being made up of an A/D converter 110A, a rewritable ROM 110B, an LED control circuit 110D, and an LED driving circuit 110C).

The light sensor 102 detects respective light intensities of the red, green, blue LED chips 104 provided in the tile 112, and transmits, to the A/D converter 110A, an analog signal corresponding to the light intensities. The A/D converter 110A converts the analog signal into a digital signal.

The rewritable ROM 110B stores a light sensor reference value corresponding to an output value produced by the light sensor 102 in cases where the LED chips 104 emit light having a predetermined chromaticity and a predetermined luminance. The light sensor reference value and the output value of the light sensor 102 are sent to the LED control 110D provided in the tile 112, and the LED driving circuit 110C drives the LED chips 104 in accordance with a control signal transmitted from the LED control circuit 110D.

The microcomputer 111 is used commonly for all the tiles 112. On this occasion, the microcomputer 111 simply generates such a setting signal that chromaticity and luminance each set by a viewer of the liquid crystal display apparatus are obtained, and sends the setting signal to the LED control circuit 110D provided in the integrated circuit element 110Z.

The LED control circuit 110D sends, to the LED driving circuit 110C, such a control signal that a standardized light sensor output (i.e., the ratio between (i) the signal obtained by the light sensor 102 and (ii) the light sensor reference value) corresponds to a value that is based on the setting signal. The LED driving circuit 110C controls, in accordance with the control signal, the pulse width of a PWM (pulse width modulation) driving current that is to be supplied to the LED chips 104.

Note that there is a question of whether or not feedback control can be carried out only within a tile although a light sensor 102 of the tile receives light from a neighboring tile. For example, in cases where the luminance of the neighboring tile is actually low, the luminance of light-emitting elements provided in the aforementioned tile inevitably becomes higher than a predetermined value by carrying out feedback control of compensating for the low luminance of the neighboring tile. This raises such a problem that luminance unevenness increases. The same is true of chromaticity. Moreover, as with the present embodiment, in a structure in which one tile is not shielded from light emitted from another tile, the light sensor 102 may receive more light from the neighboring tile than from the aforementioned tile. However, in cases where feedback control is carried out for each of the tiles of the display apparatus, the chromaticity and luminance of the neighboring tile are kept constant. Therefore, even when closed-loop feedback control is carried out within such a tile, it is possible to correct variations in chromaticity and luminance mainly within each of the tiles. This makes it possible to carry out such feedback control that no unevenness occurs in the entire backlight device.

Note that functional correspondence between (i) the arrangement described in the present embodiment and (ii) the arrangement described in the First Invention is as follows: the liquid crystal display apparatus 101 corresponds to the liquid crystal display apparatus 1; the liquid crystal panel 123 corresponds to the liquid crystal unit 2; the integrated circuit elements 110 of each of the tiles 112 correspond to the backlight control section 5; the rewritable ROM 110B corresponds to the reference light intensity data memory 51e; the microcomputer 111 corresponds to the control function of the driving and power supply circuit 6; the tiles 112 correspond to the backlight substrates 31; the light sensor 102 corresponds to the color sensor 31a; and the LED chips 104 correspond to LEDs 31b.

(Method for Adjusting a Light Sensor Reference Value with Respect to Each Tile in Embodiment 1 of the Second Invention)

The following explains how a light sensor reference value necessary for obtaining a standardized light sensor output is set and how the light sensor reference value is stored in the rewritable ROM 110B.

Figure 18:
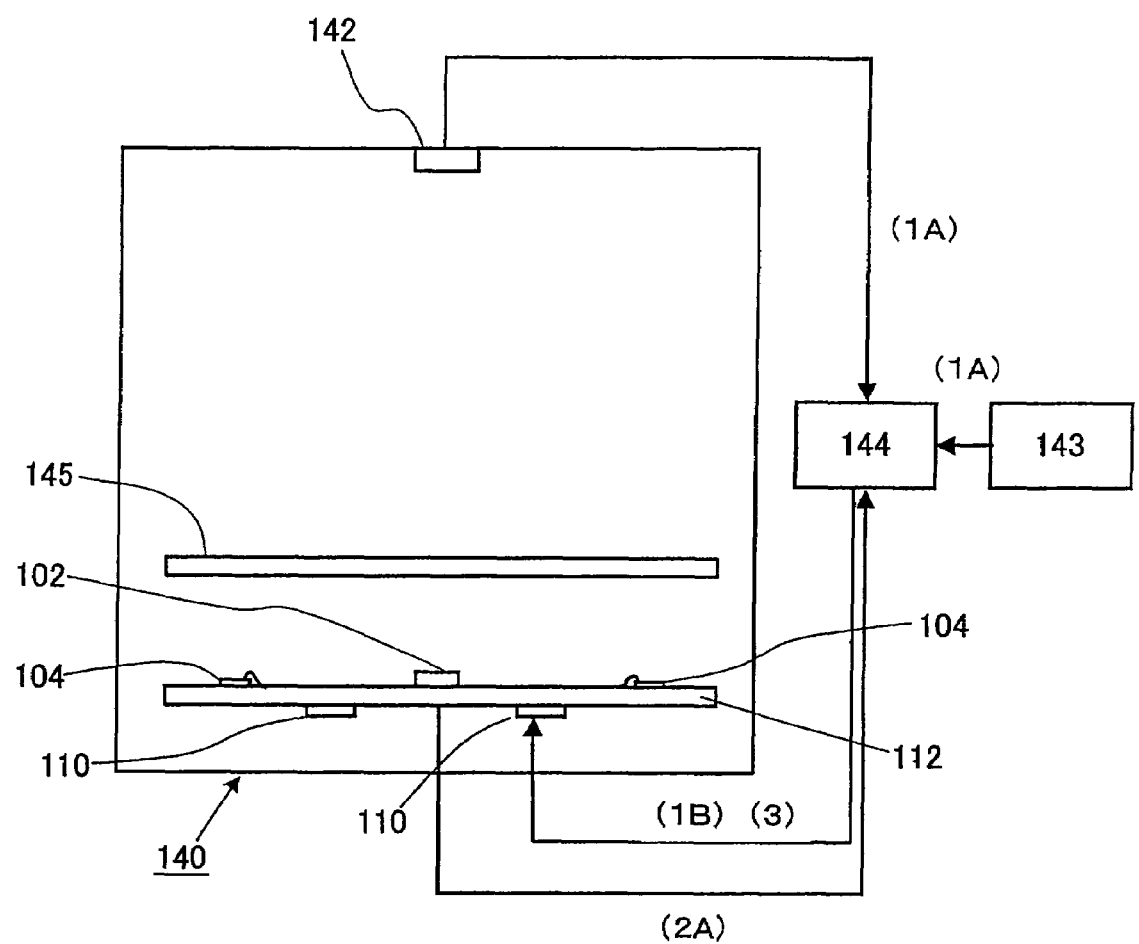
FIG. 18 shows a device for adjusting a tile that is to be provided in the backlight device of Embodiment 1 of the Second Invention.

Each of the tiles 112 is placed into a tile adjusting apparatus 140 shown in FIG. 18. The tile adjusting apparatus 140 has an external light sensor 142 for receiving light emitted from the plurality of LED chips 104 of the tile 112. Further, the tile adjusting apparatus 140 includes a diffusion plate 145 for diffusing light emitted from the LED chips 104 of the tile 112. The diffusion plate 145 is made of the same material as the diffusion plate 122 used for the liquid crystal display apparatus 101. The diffusion plate 145 is provided so that the distance between the tile 112 and the diffusion plate 145 is equal to the distance between the tile 112 and the diffusion plate 122. The external light sensor 142 used herein is a sensor identical to the light sensor 102, but may be a sensor different from the light sensor 102.

Whereas the light sensor 102 detects light reflected by the diffusion plate 122, the external light sensor 142 detects light transmitted by the diffusion plate 145. For this reason, respective outputs of the light sensor 102 and the external light sensor 142 do not correspond to each other. In light of this, the light sensor 102 and the external light sensor 142 carry out detection at the same time under the state in which the LED chips 104 emit light, and a coefficient of correlation between respective outputs of the light sensor 102 and the external light sensor 142. For the purpose of eliminating background offset, respective outputs of the light sensor 102 and the external light sensor 142 may be obtained under the state in which the LED chips 104 are turned off, and the coefficient of correlation may be corrected by using the outputs.

Note that the distance between the external light sensor 142 and the tile 112 is preferably longer than the length of a diagonal line of the tile 112, more preferably longer than the length of twice the diagonal line of the tile 112.

An external control circuit 144 reads-in (i) values which are set in an external memory 143 and which respectively correspond to a predetermined chromaticity and a predetermined luminance and (ii) detection values of the external light sensor 142 (Step 1A). The external control circuit 144 sends, to the LED driving circuit 110C (see FIG. 17(*a*)) provided in the integrated circuit element 110, such a control signal that the detection values of the external light sensor 142 become equal respectively to the set values of the external memory 143, and the LED driving circuit 110C drives all the LED chips 104 (Step 1B). The external control circuit 144 receives an output produced by the light sensor 102 at that time (Step 2A), and an operation of calculating a value obtained through multiplication by the correlation coefficient (i.e., calculating a light sensor reference value) is carried out (Step 2B). Then, the light sensor reference value is stored in the rewritable ROM 110B (see FIG. 17(*a*)) provided in the integrated circuit element 110 (Step 3).

The predetermined chromaticity and the predetermined luminance may be values obtained at one point where the luminance is high and the color temperature is at a predetermined level (e.g., 9000K). Alternatively, the predetermined chromaticity and the predetermined luminance may be values obtained at a plurality of points, e.g., four points obtained by combining the following cases (i) to (iv): (i) the luminance is high; (ii) the luminance is low (e.g., one-fifth the high luminance); (iii) the color temperature is high (e.g., 12000K); and (iv) the color temperature is low (e.g., 5000K). Alternatively, the red, green, and blue LEDs do not need to be driven at the same time. In such a case, an operation including the following steps (1) to (3) is carried out with respect to the red LED first. In the step (1), the external control circuit 144 reads out a predetermined luminance (low luminance, middle luminance, high luminance) of the red LED from the external memory 143, and sends a control signal to the driving circuit 110C so that a detection value of the external light sensor 142 becomes equal to the predetermined luminance, thereby driving the red LED (Step 1 concerning R). In the step (2), the external control circuit 144 reads-in an output produced by the light sensor 102 in the step (1), and calculates a value obtained through multiplication by the correlation coefficient (i.e., calculates a light sensor reference value) (Step 2 concerning R). In the step (3), the light sensor reference value is stored in the rewritable ROM 110B provided in the integrated circuit element 110 (Step 3 concerning R). The same operation may be carried out with respect to the green and blue LEDs. Such a relatively small number of light sensor reference values may be stored, and light sensor reference values that could be obtained under other conditions may be made up by calculations. Alternatively, a large number of light sensor reference values (e.g., values obtained at 256 points) may be stored.

The tile adjusting apparatus 140 having the external light sensor 142 (or substantially the same tile adjusting apparatus arranged so as be able to carry out the same adjustment as does the tile adjusting apparatus 140) is commonly used for adjusting all the tiles 112, and a light sensor reference value in each of the tiles 112 is stored in the rewritable ROM 110B of the tile 112. With this, a backlight device having excellent uniformity is obtained simply by combining the tiles 112 unadjusted. Further, for example, in cases where one tile 112 is damaged in the backlight device, it is only necessary to replace the damaged tile 112 with a new tile 112. The new tile 112 thus mounted does not require an adjustment, but can emit light identical to light emitted from a neighboring tile. This makes it easy to carry out repairs.

Embodiment 2 of the Second Invention

Another problem is that it is difficult to carry out an adjustment so as to obtain luminance uniformity or chromaticity uniformity within a tile. For example, see a technique disclosed in United States Unexamined Patent Publication No. 2006103612 (published on May 18, 2006). According to the technique, a driving voltage and a duty ratio are stored for each LED so that variations in luminance of the LED are corrected. In such a case, luminance uniformity is obtained initially. However, the luminescence intensity of the LED is inevitably changed when conditions such as the temperature of the LED are changed. In cases where LEDs of a plurality of colors are used, chromaticity uniformity is also lost.

The present embodiment not only sets chromaticity and luminance for each tile but also uses means for obtaining light uniformity within each tile substrate. Moreover, the present embodiment carries out feedback control using a light sensor, so that light uniformity is not changed even when a temperature change or the like occurs.

An effect of improving light uniformity is obtained also by disposing a large number of small tiles. However, this causes an increase in the number of parts such as light sensors. This results in high production cost. Therefore, the present embodiment may be more industrially applicable depending on the cost of the parts.

Figure 19:
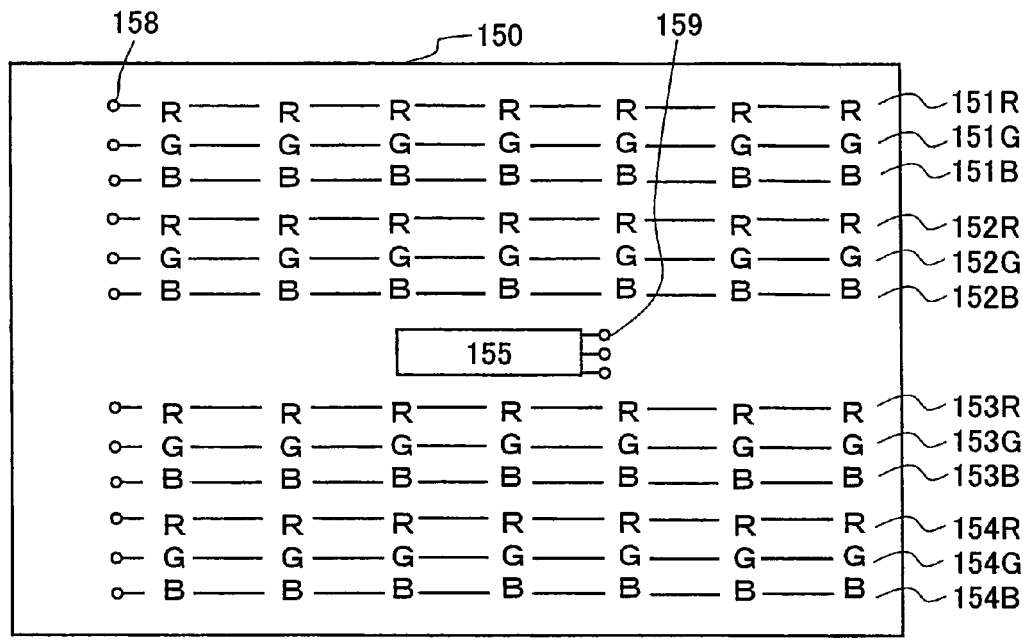
FIGS. 19(a) and 19(b) are front and rear views of a tile provided in a backlight device of Embodiment 2 of the Second Invention, respectively.
Figure 19:
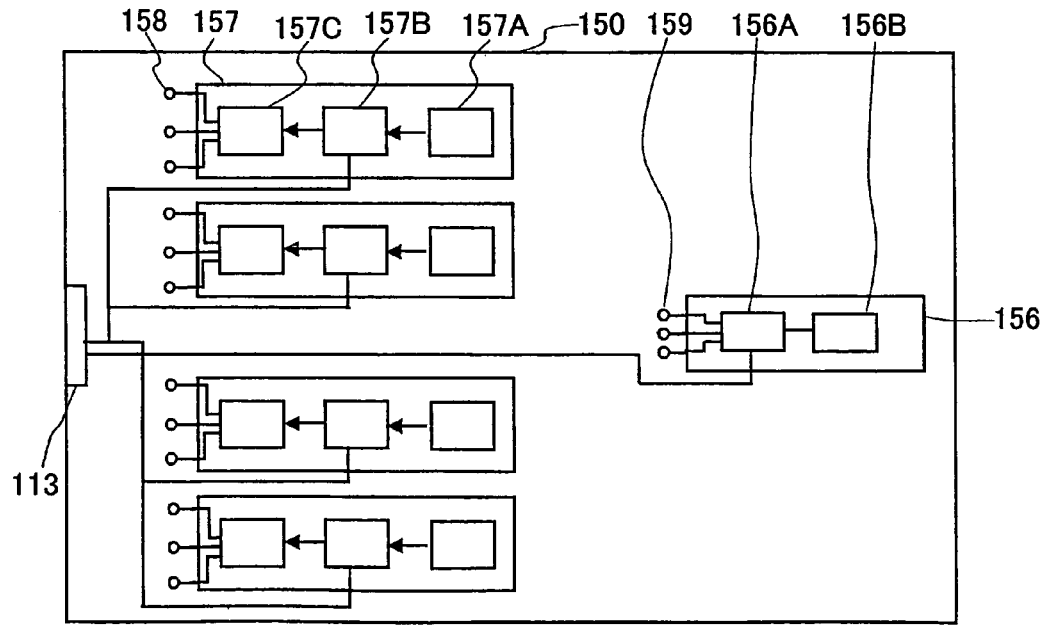

FIGS. 19(a) and 19(b) are front and rear views schematically showing an arrangement of a tile 150, respectively. Mounted on a surface of the tile 150 are: (i) red LED groups 151R, 152R, 153R, and 154R, each of which includes red LEDs (each represented by "R" in FIG. 19(a)) connected in series; (ii) green LED groups 151G, 152G, 153G, and 154G, each of which includes green LEDs (represented by "G" in FIG. 19(a)) connected in series; and (iii) blue LED groups 151B, 152B, 153B, and 154B, each of which includes blue LEDs (represented by "B" in FIG. 19(a)) connected in series; and (iv) a light sensor 155. Since the LEDs are thus connected in series in each of the LEDs groups, it is only necessary to set, for the LED group, a proportional coefficient serving as a correction value. It is also possible that: the LEDs are not connected in series; and a correction value is set for each of the LEDs; and the LEDs are driven individually.

The LED groups 151R to 154B mounted on the surface of the tile 150 are connected, via through holes 158, to integrated circuit elements 157 mounted on a rear surface of the tile 150, respectively. The light sensor 155 is connected, via through holes 159, to an integrated circuit element 156 mounted on the rear surface of the tile 150.

A backlight device according to the present embodiment operates as follows. First, LED groups 151R to 154B provided in each of tiles 150 constituting the backlight device are turned on. Light emitted from LEDs provided in the tile and its neighboring tiles is reflected by a diffusion plate 122 (same as that shown in FIG. 13), and is detected by a light sensor 155. The light sensor 155 generates a light signal. The light signal is sent to an A/D converter 156A provided in the integrated circuit element 156. Then, the light signal is sent, via a connector 113, to a microcomputer 111 (same as that shown in FIG. 13) provided outside of the tile 150. On this occasion, the light signal is sent together with a light sensor reference value stored in a rewritable ROM 156B provided in the integrated circuit element 156.

The microcomputer 111 generates a control signal so that a standardized light sensor output of the light sensor 155 becomes constant. The control signal is sent to a correction circuit 157B provided in each of the integrated circuit elements 157. The correction circuit 157B (i) refers to data (described later) stored in a rewritable ROM 157A storing a correction value, (ii) corrects the control signal, and (iii) sends the corrected control signal to an LED driving circuit 157C. The LED driving circuit 157C drives, for example, the LED group 151R in accordance with the corrected control signal. The same is true of the other LED groups 151G and 151B. The present embodiment considers the LED groups 151R, 151G, and 151B to be one set, and drives the set of LED groups 151R, 151G, and 151B by using the LED driving circuit 157C. However, for example, it is possible to consider the LED groups 151R, 152R, 153R, and 154R to be one set and to provide a driving circuit for the set of LED groups 151R, 152R, 153R, and 154R. It is also possible to drive all the LED groups of the tile 150 by using a single LED driving circuit. Further, the LEDs of each of the LED groups does not need to be connected in series, but may be either connected in parallel or connected both in series and in parallel. The LEDs do not need to constitute the LED group, and each of the LEDs may be individually driven by a driving circuit connected thereto.

By thus (i) driving each of the LED groups in accordance with a control signal corrected for the LED group and (ii) carrying out feedback control so that the standardized light sensor output becomes equal to a predetermined value, it is possible to drive the backlight device which emits light uniformly even within a tile.

The light sensor 155 may be made up of only one photodiode using no filter. In this case, light emitted from the red LEDs, light emitted from the green LEDs, and light emitted from the blue LEDs are detected as follows. That is, during the operation of the backlight device, the light emitted from the red LEDs is detected by the light sensor 155 within a period of time set so that only the red LEDs are on and the LEDs of the other colors are off. The detection is carried out in the same manner with respect to the LEDs of the other colors, so that information concerning chromaticity and luminance is obtained. The detection method has an advantage of not being affected by deterioration in a filter.

(Method for Adjusting a Light Sensor Reference Value and an LED Group Correction Coefficient with Respect to Each Tile in Embodiment 2 of the Second Invention)

As with Embodiment 1 of the Second Invention, the present embodiment sets a light sensor reference value for the entire backlight device. In addition, for the purpose of reducing variations within the tile 150, the present embodiment carries out a setting of information (hereinafter referred to as "LED group correction coefficient") corresponding to a condition for driving each of the LED groups 151R to 154B so that each of the LED groups 151R to 154B emits light having a predetermined luminance or chromaticity. The setting is carried out as follows.

Figure 20:
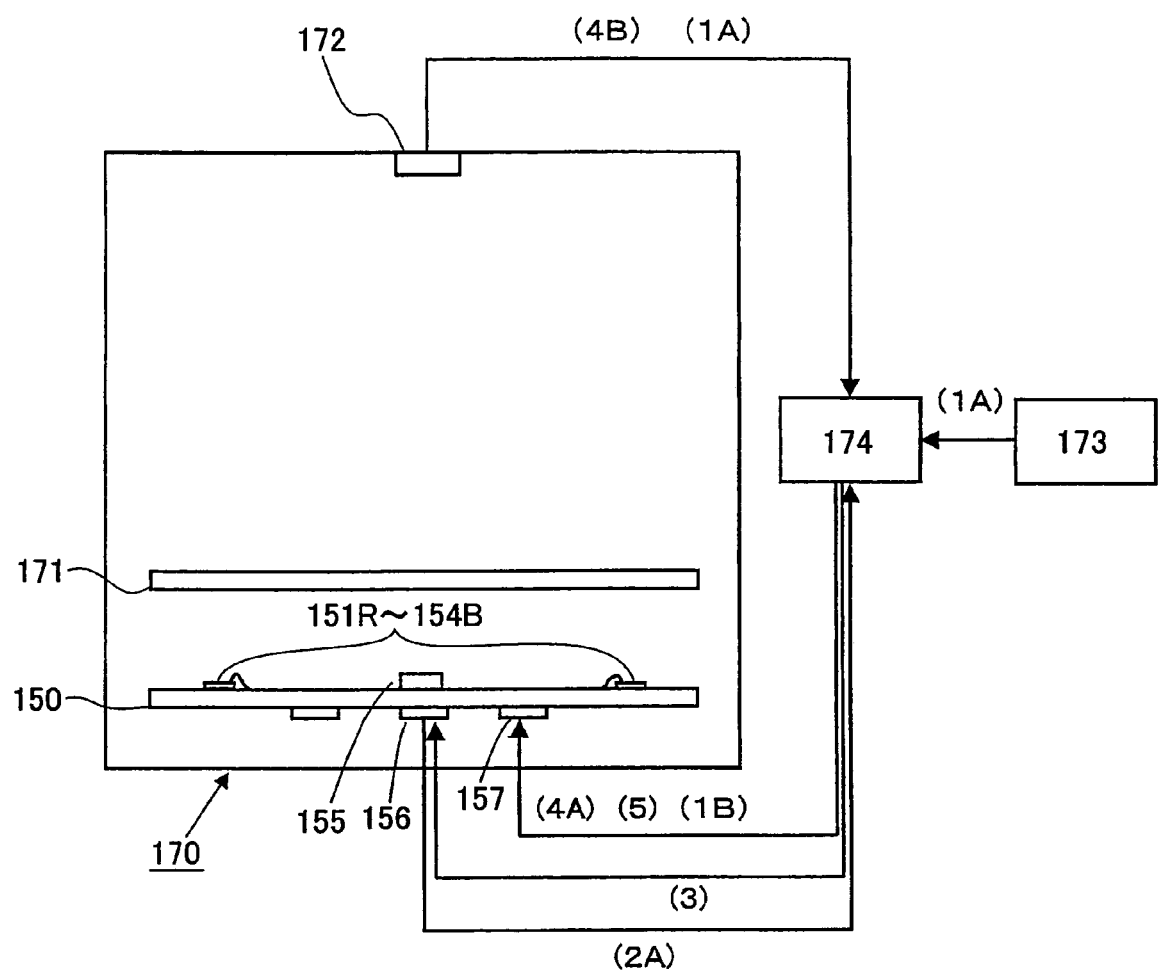
FIG. 20 shows a device for adjusting a tile that is to be provided in the backlight device of Embodiment 2 of the Second Invention.

The tile 150 is placed into a tile adjusting apparatus 170 shown in FIG. 20. The tile adjusting apparatus 170 includes: a diffusion plate 171 for diffusing light emitted from the LED groups 151R to 154B of the tile 150; and an area sensor 172 for detecting, as an image, variations in chromaticity and luminance within the diffusion plate 171. The diffusion plate 171 is made of the same material as the diffusion plate 122 used for the liquid crystal display apparatus 101, and is provided so that the distance between the tile 150 and the diffusion plate 171 is identical to the distance between the tile 150 and the diffusion plate 122.

An external control circuit 174 sends a control signal to the integrated circuit element 157 (Step 4A). The LED driving circuit 157C turns on the LED groups 151R to 154B, so that the diffusion plate 171 is illuminated. Then, the chromaticity and luminance of the diffusion plate 171 are detected by using the area sensor 172, and the external control circuit 174 detects the ratios of the detection values to average values (variations within the substrate) (Step 4B). For example, in cases where a part, which is close to the LED groups 151R, 151G, and 151B, of the diffusion plate 171 has a reddish color, a correction coefficient serving as such a proportional coefficient that the driving output of the red LED group 151R is reduced is written in the corresponding rewritable ROM 157A (see FIG. 19(b)) (Step 5 concerning chromaticity). Further, for example, in cases where the part, which is close to the LED groups 151R, 151G, 151B, of the diffusion plate 171 is darker than other parts of the diffusion plate 171, such a correction coefficient that the respective driving outputs of the LED groups 151R, 151G, and 151B are increased is stored in the corresponding rewritable ROM 157A (Step 5 concerning luminance).

The following explains how a light sensor reference value is stored in a memory.

The external control circuit 174 reads-in (i) values which are set in an external memory 173 so as to respectively correspond to a predetermined chromaticity and a predetermined luminance and (ii) detection values of the area light sensor 172 (Step 1A). The external control circuit 174 sends, to the correction circuit 157B (see FIG. 19(b)) provided in the integrated circuit element 157, a control signal so that the detection values of the area light sensor 172 become equal respectively to the values set in the external memory 173 so as to respectively correspond to the predetermined chromaticity and the predetermined luminance. The correction circuit 157B (i) refers to data stored in a rewritable ROM 157A storing a correction value, (ii) corrects the control signal, and (iii) sends the corrected control signal to an LED driving circuit 157C. The LED driving circuit 157C drives all the LED groups 151R to 154B (Step 1B). Red, green, and blue outputs produced as an image by the area sensor 172 are averaged, so that the area sensor 172 works as a mere light sensor.

An output produced by the light sensor 155 at that time is sent to the external control circuit 174 (Step 2A), and a light sensor reference value is calculated (Step 2B). Since the diffusion plate 171 is provided, the output of the light sensor 155 corresponds substantially to an output to be produced by the light sensor 155 actually incorporated into the liquid crystal display apparatus 101. However, in cases where there is a difference between the outputs, the difference is calculated. Then, the light sensor reference value is calculated which is an output produced by the light sensor 155 under the state in which the averaged detection values become equal to the predetermined chromaticity and the predetermined luminance.

Moreover, the light sensor reference value is stored in the rewritable ROM 156B provided in the integrated circuit element 156 (see FIG. 19(b)) (Step 3). Note that Steps 1 to 3 may be carried out for each of the colors as described above.

Thus, the light sensor reference value is set after the LED group correction coefficient has been set. With this, the adjustment is simplified. The LED group correction coefficient may be set after the light sensor reference value has been set. However, on this occasion, the light sensor reference value may be misaligned. In such a case, the light sensor reference value only needs to be set again.

The distance between the area sensor 172 and the diffusion plate 171 is preferably longer than the length of a diagonal line of the tile 150, more preferably longer than the length of twice the diagonal line of the tile 150.

In this way, a light sensor reference value of each tile 150 is stored in a rewritable ROM 156B of the tile 150, and an LED group correction coefficient of each tile 150 is stored in a rewritable ROM 157A of the tile 150. Then, the backlight device is driven in accordance with the light sensor reference value and the LED group correction coefficient. This makes it possible to obtain a backlight device in which uniform chromaticity and uniform luminance are obtained both among tiles and within a tile.

In the present embodiment, an LED group correction coefficient is set for each LED group. However, for the purpose of emitting light more uniformly, it is preferable that LEDs be driven individually and that a correction coefficient be set for each of the LEDs. This corresponds to a case where the number of LEDs provided in an LED group is 1.

Embodiment 3 of the Second Invention

In the present embodiment, integrated circuit elements 187 are disposed on a surface of each of tiles 180. Further, LED groups are disposed differently.

Figure 21:
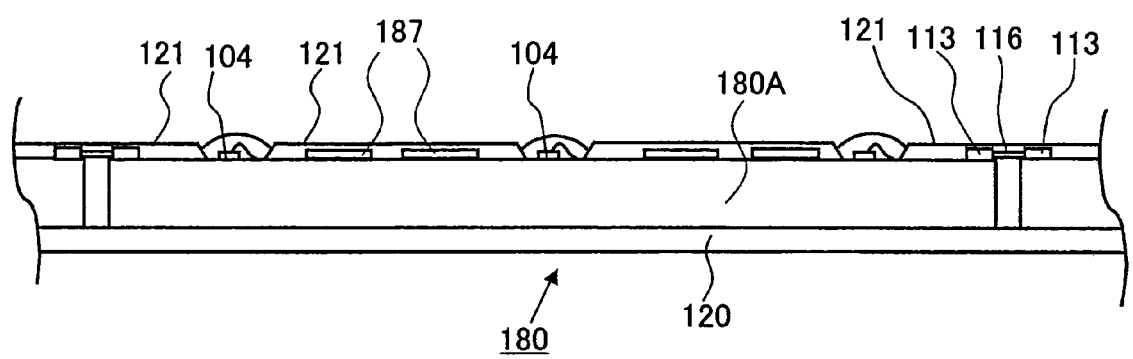
FIG. 21 is a cross-sectional view of a tile provided in a backlight device of Embodiment 3 of the Second Invention.

FIG. 21 is a cross-sectional view of the tile 180 according to the present embodiment. Each of the integrated circuit elements 187 is disposed on a surface of a base substrate 180A, and a high-reflectance member 121 is provided so as to cover the integrated circuit element 187. The high-reflectance member 121 has the following functions (1) and (2): (1) the high-reflectance member 121 reflects light emitted transversely from each of LEDs 104 constituting each of LED groups, in order that the light is reflected upward; and (2) the high-reflectance member 121 re-reflects light returning from a diffusion plate 122 (not shown) to the substrate. Further, connectors 113 and cables 116 that are used for connecting the tiles 180 are also covered with the high-reflectance member 121.

The tile 180 is structured so as to have a rear surface that has direct contact with a chassis 120. With this, heat is radiated efficiently.

Figure 22:
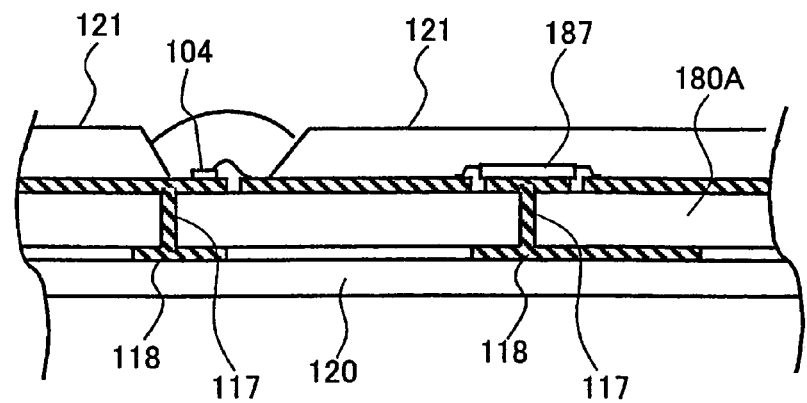
FIG. 22 is an enlarged sectional view of the tile provided in the backlight device of Embodiment 3 of the Second Invention.

FIG. 22 is a cross-sectional view obtained by enlarging part of FIG. 21. Provided beneath a region where the LED chip 104 has been die-bonded is a through hole 117 that leads to a multilayer wire 118 provided on a rear surface of the base substrate 180A. Further, provided directly below a region where the integrated circuit element 187 has been die-bonded is also a through hole 117 that leads to the multilayer wire 118 provided on the rear surface of the tile 180. The multilayer wire 118 has direct contact with the chassis 120. With this, heat due to the LED chip 104 and the integrated circuit element 187 is guided to the multilayer wire 118 via each of the through holes 117, so that the heat can be radiated from the chassis 120 to the outside.

Figure 23:
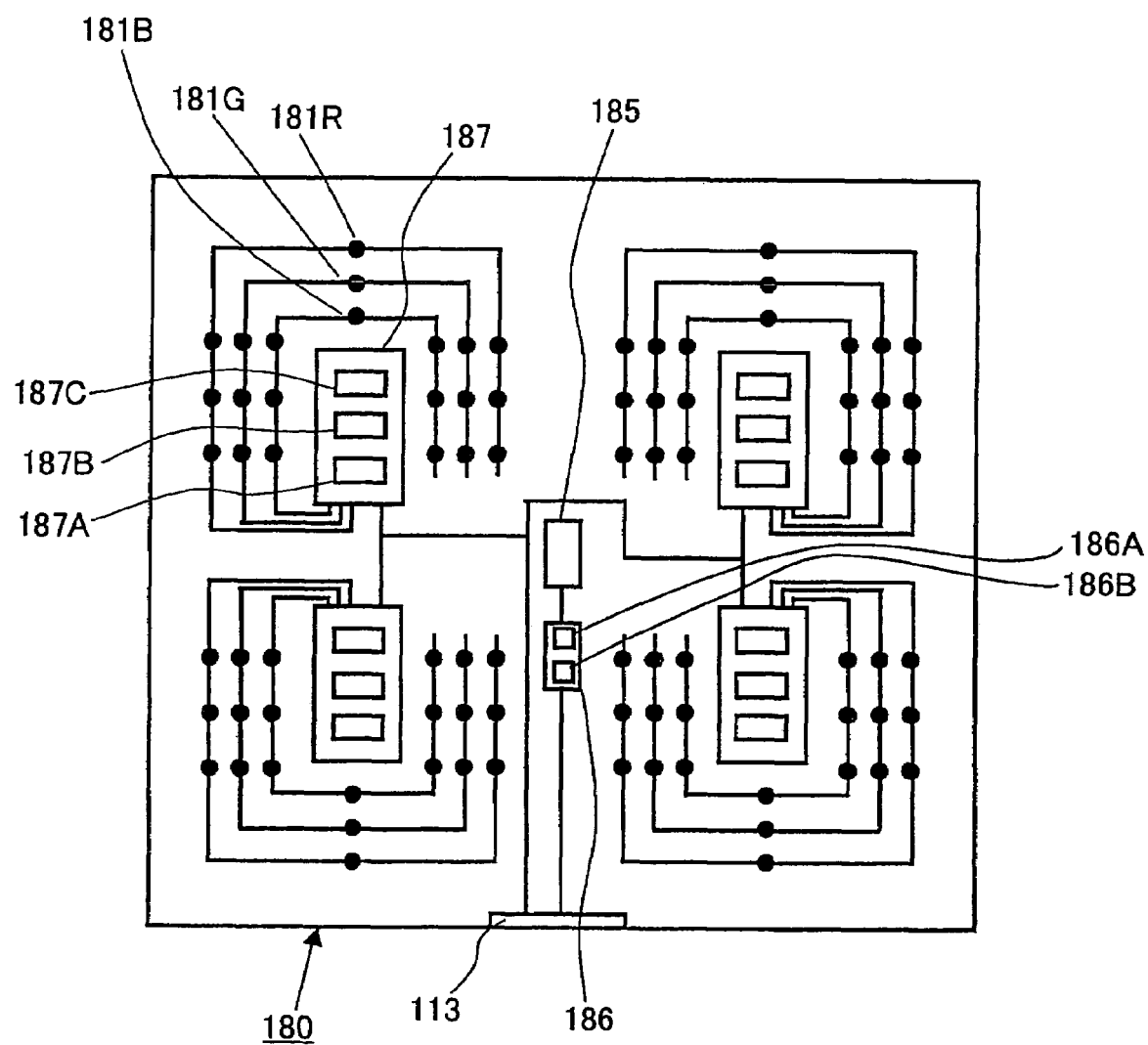
FIG. 23 is a diagram schematically showing a surface of the tile provided in the backlight device of Embodiment 3 of the Second Invention.

FIG. 23 is a diagram schematically showing the surface of the tile 180. Mounted on the surface of the tile 180 are: (i) red LED groups 181R, 182R, 183R, and 184R, each of which includes red LEDs connected in series; (ii) green LED groups 181G, 182G, 183G, and 184G, each of which includes green LEDs connected in series; and (iii) blue LED groups 181B, 182B, 183B, and 184B, each of which includes blue LEDs connected in series; and (iv) a light sensor 185. The LED groups 181R, 181G, and 181B, the LED groups 182R, 182G, and 182B, the LED groups 183R, 183G, and 183B, and the LED groups 184R, 184G, and 184B, which are combinations of red, green, and blue LED groups, are respectively disposed in the four quadrants of the tile 180, and are disposed axisymmetrically both in a longitudinal direction and in a transverse direction with respect to the light sensor 185.

A backlight device using the tile operates as follows. When each of the LED groups is driven, the light sensor 185 generates a light signal. The light signal is sent to an A/D converter 186A provided in an integrated circuit element 186. Then, together with a light sensor reference value stored in a rewritable ROM 186B provided in the integrated circuit element 186, the light signal is sent, via a connector 113, to a microcomputer 111 (not shown) provided outside of the tile 180. The microcomputer 111 generates a control signal corresponding to a predetermined luminance and a predetermined chromaticity, and the control signal is sent to a correction circuit 187B provided in the integrated circuit element 187 mounted on the surface of the tile 180. The correction circuit 187B (i) refers to data stored in a rewritable ROM 187A storing an LED group correction coefficient, (ii) corrects the control signal, and (iii) sends the corrected control signal to an LED driving circuit 187C. The LED driving circuit 187C drives, for example, the LED groups 181R in accordance with the corrected control signal. The same is true of the other LED groups 181G and 181B. With this, the luminance and chromaticity are held constant within the tile, and feedback control of correcting variations within the tile is carried out. The same control is carried out in neighboring tiles. With this, the backlight device operates as a backlight device having uniform luminance and uniform chromaticity.

(Method for Adjusting a Light Sensor Reference Value and an LED Group Correction Coefficient with Respect to Each Tile in Embodiment 3 of the Second Invention)

As with Embodiment 1 of the Second Invention, the present embodiment sets a light sensor reference value for the entire backlight device. Unlike Embodiment 2 of the Second Invention, the present embodiment do not use an area sensor. For the purpose of reducing variations within the tile 180, the present embodiment sets an LED group correction coefficient for each of the LED groups 181R to 184B. The setting is carried out as follows.

Figure 24:
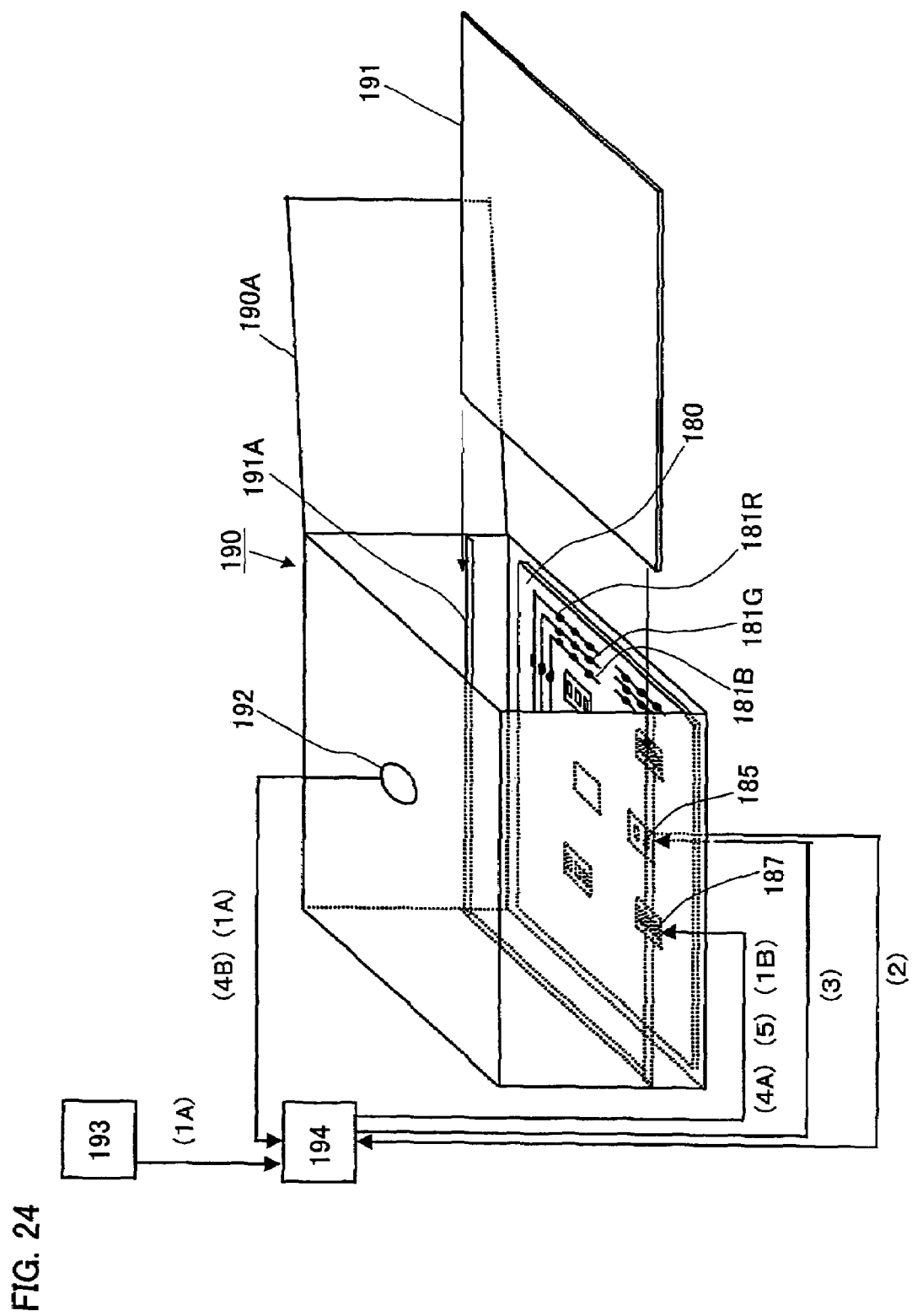
FIG. 24 shows a device for adjusting a tile that is to be provided in the backlight device of Embodiment 3 of the Second Invention.
Figure 25:
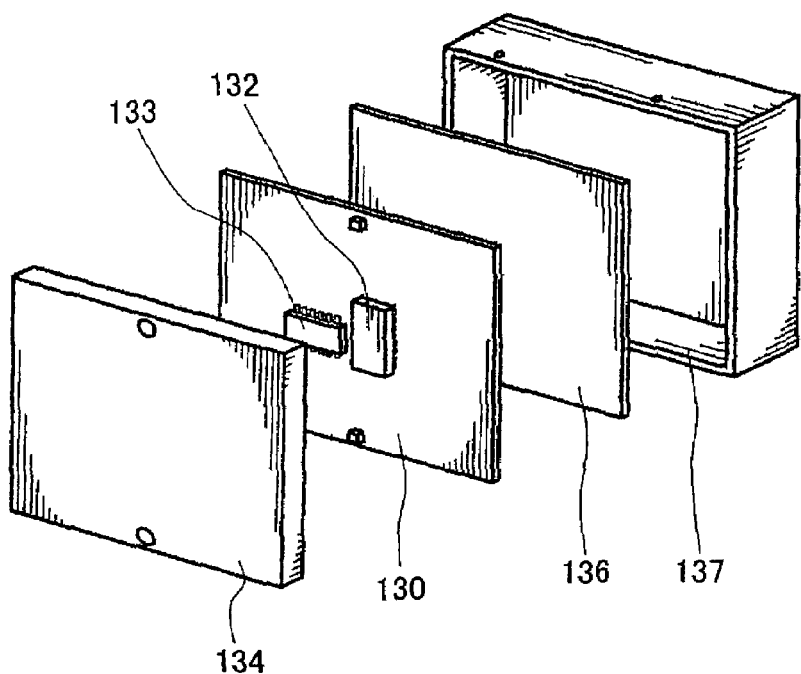
FIGS. 25(a) and 25(b) show a liquid crystal display apparatus using a conventional backlight device.
Figure 25:
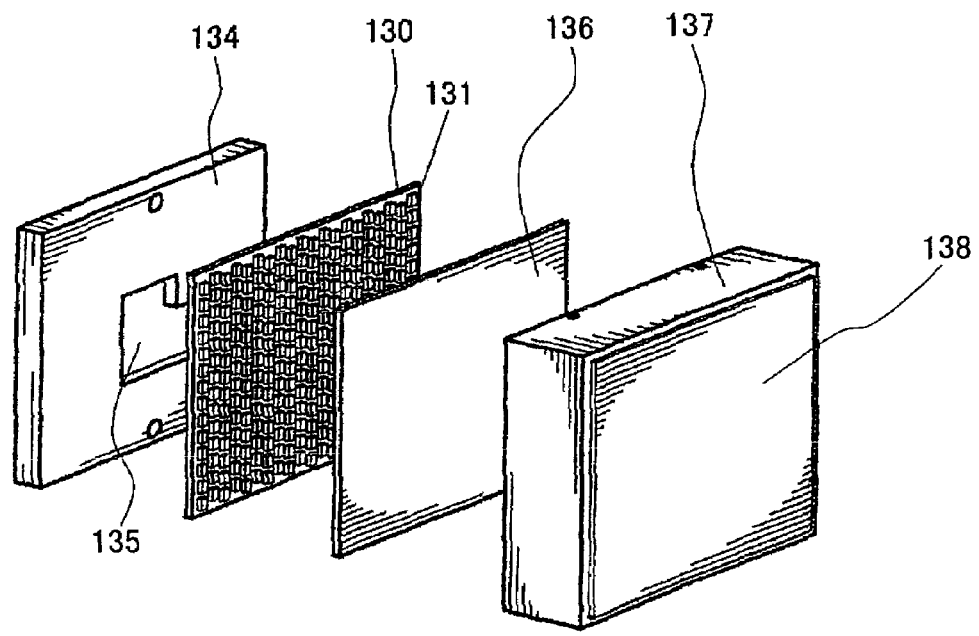

The tile 180 and a diffusion plate 191 are placed into a tile adjusting apparatus 190 shown in FIG. 24. A lid 190A is closed so that the tile 180 and the diffusion plate 191 are placed in a dark place. The diffusion plate 191 is supported by rails 191A. Provided on an upper surface of the tile adjusting apparatus 190 is an external light sensor 192.

An external control circuit 194 sends, to driving circuits 187C (see FIG. 23) of four integrated circuit elements 187, control signals for turning on red LED groups 181R, 182R, 183R, and 184R, respectively (Step A concerning R), so that the diffusion plate 191 is illuminated. The external control circuit 194 reads-in the chromaticity and luminance of the diffusion plate 191 from the external light sensor 192, and detects the ratios of the read-in values to average values (variations within the substrate) (Step 4B concerning R). The external control circuit 194 inputs, to each of respective rewritable ROMs 187A (see FIG. 23) of the four integrated circuit elements 187, an LED group correction coefficient serving as a proportional coefficient for obtaining a driving output identical to an output produced by the external light sensor 192 in Step 4B (Step 5 concerning R).

The same correction coefficient inputting operation is carried out with respect to green LED groups 181G to 184G and blue LED groups 181B to 184B.

After the foregoing operation, the external control circuit 194 reads-in (i) set values of an external memory 193 and (ii) output values of the external light sensor 192 (Step 1A concerning R). Then, the external control circuit 194 controls a lighting of the red LED groups 181R to 184R so that the output values of the external light sensor 192 become equal respectively to the set values of the external memory 193 (Step 1B concerning R). Then, the external control circuit 194 obtains an output value of the light sensor 185, and calculates a light sensor reference value (Step 2 concerning R). Then, the external control circuit 194 writes the light sensor reference value in a rewritable ROM 186B (see FIG. 23) provided in an integrated circuit element 186 (Step 3 concerning R). This operation is carried out for the LED groups of each of the colors. In this case, for the purpose of calculating the light sensor reference value, a correlation between (i) an output produced by the light sensor 185 within the tile adjusting apparatus 190 and (ii) an output produced by the light sensor 185 actually provided in a liquid crystal apparatus is calculated in advance.

By carrying out the foregoing adjustment with the diffusion plate 191 inserted, a value close to a value of an output produced by the light sensor 185 incorporated into a liquid crystal display apparatus is obtained. Under some conditions, the foregoing calculation can be omitted (it is conceivable to carry out a calculation using a coefficient of 1). However, the foregoing adjustment can be carried out even under the state in which the diffusion plate 191 has been removed.

Other Possible Embodiments of the Second Invention

According to each of the foregoing embodiments, a single tile is made up of a single base substrate and other components. However, a tile only needs to be able to be treated as a single entity. Therefore, for example, a single tile may include: a first substrate; a second substrate attached onto a rear surface of the first substrate; and an integrated circuit and the like disposed on the second substrate.

Suppose, for example, there is a single tile including a total of four tiles (2×2 tiles (2 tiles wide by 2 tiles high)) according to the foregoing embodiment. In such a case, there are four sensors that are not disposed in the center of the single tile. However, this is essentially no different from the foregoing embodiment.

Further, the foregoing embodiment does not use a temperature sensor. However, an LED chip, especially a red LED chip, has a wavelength that varies with the temperature. Therefore, the luminance in view of visibility may not be stabilized simply by stabilizing the light intensity. For the purpose of compensating for this point, a temperature sensor is used, and LED driving output may be corrected in accordance with a detection value of the temperature sensor.

Further, the foregoing embodiment uses a rewritable ROM as a memory. However, a one-time writable ROM, a flash memory, or a RAM backed up by a battery may be used.

Further, the foregoing embodiment assumes that light sensors are used in all of the tiles. However, light sensors may be mounted only on some of the tiles.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A backlight device, comprising:
   a plurality of substrates each of which includes one or more light-emitting elements, a light sensor, and a memory; and
   a driving circuit for driving each of the light-emitting elements, wherein
   the memory of each of the substrates stores information corresponding to a value of an output produced by the light sensor under such condition that the light-emitting element emits light having a predetermined luminance or chromaticity, and
   the light-emitting element is driven in a time-sharing manner so that the light sensor detects each of different colors of light emitted from the light-emitting element.

2. The backlight device as set forth in claim 1, wherein the substrate includes the driving circuit for driving the light-emitting element of the substrate.

3. The backlight device as set forth in claim 1, further comprising a control circuit for (i) standardizing the output of the light sensor in accordance with the information stored in the memory corresponding to the light sensor and (ii) generating a control signal for the driving circuit so that the standardized output of the light sensor corresponds to a set value of luminance or chromaticity of the backlight device.

4. The backlight device as set forth in claim 3, wherein the control circuit is provided outside of the substrate.

5. A backlight device, comprising:
   a plurality of substrates each of which includes one or more light-emitting elements, a light sensor, and a memory;
   a driving circuit for driving each of the light-emitting elements, wherein
   the memory of each of the substrates stores information corresponding to a value of an output produced by the light sensor under such condition that the light-emitting element emits light having a predetermined luminance or chromaticity; and
   a control circuit provided outside of the substrate, said control circuit for (i) standardizing the output of the light sensor in accordance with the information stored in the memory corresponding to the light sensor and (ii) generating a control signal for the driving circuit so that the standardized output of the light sensor corresponds to a set value of luminance or chromaticity of the backlight device,
   wherein the control circuit generates a time-sharing control signal for each of the substrates.

6. The backlight device as set forth in claim 3, wherein:
   the control circuit includes a plurality of control circuits, and
   each of the control circuits is provided in each of the substrates.

7. The backlight device as set forth in claim 1, wherein the light-emitting elements include a blue light-emitting element, a green light-emitting element, and a blue light-emitting element.

8. The backlight device as set forth in claim 7, wherein at least one of the red, green, and blue light-emitting elements includes an LED.

9. The backlight device as set forth in claim 1, wherein the light sensor is provided on the substrate so as to be disposed substantially in a central part of a surface having the light-emitting elements.

10. The backlight device as set forth in claim 1, wherein the light sensor includes (i) a light sensor for detecting blue light, (ii) a light sensor for detecting green light, and (iii) a sensor for detecting red light.

11. The backlight device as set forth in claim 1, wherein the memory stores information corresponding to a value of an output produced by the light sensor under such condition that the light-emitting element provided in the substrate emits light having a predetermined color temperature.

12. The backlight device as set forth in claim 7, wherein the memory stores information corresponding to a value of an output produced by the light sensor under such condition that each of the red, green, and blue light-emitting elements provided in the substrate emits light having a predetermined luminance.

13. A backlight device, comprising:
   a plurality of substrates each of which includes one or more light-emitting elements, a light sensor, and a memory; and
   a driving circuit for driving each of the light-emitting elements, wherein
   the memory of each of the substrates stores information corresponding to a value of an output produced by the light sensor under such condition that the light-emitting element emits light having a predetermined luminance or chromaticity and to variations in luminance or chromaticity among the light-emitting elements provided in the substrate.

14. The backlight device as set forth in claim 13, wherein the light-emitting element includes groups of light-emitting elements.

15. The backlight device as set forth in claim 14, further comprising the light-emitting element in which the groups of light-emitting elements are serially connected.

16. The backlight device as set forth in claim 4, wherein the memory stores information corresponding to a condition for driving the light-emitting elements under such condition that each of the light-emitting elements emits light having a predetermined luminance or chromaticity.

17. A backlight device, comprising:
   a plurality of substrates each of which includes one or more light-emitting elements, a light sensor, and a memory;
   a driving circuit for driving each of the light-emitting elements; and
   a control circuit provided outside of the substrate, said control circuit for (i) standardizing the output of the light sensor in accordance with the information stored in the memory corresponding to the light sensor and (ii) generating a control signal for the driving circuit so that the standardized output of the light sensor corresponds to a set value of luminance or chromaticity of the backlight device, wherein
   the memory of each of the substrates includes
   (i) a first memory storing information corresponding to the value of an output produced by the light sensor under such condition that the light-emitting element provided in the substrate emits light having the predetermined luminance or chromaticity, and
   (ii) a second memory storing information corresponding to variations in luminance or chromaticity among the light-emitting elements provided in the substrate.

18. The backlight device as set forth in claim 1, wherein the substrate has (i) a surface on which the light-emitting element and the light sensor are provided and (ii) a rear surface on which the memory is provided.

19. The backlight device as set forth in claim 1, wherein the memory is incorporated into an integrated circuit element combined with the driving circuit.

20. The backlight device as set forth in claim 1, wherein the memory is a writable or rewritable memory.

21. A display apparatus, comprising:
the backlight device as set forth in claim 1; and
a non-self-luminous image display panel for displaying an image by controlling a transmission state of light emitted from the backlight device.

22. A method for driving a backlight device including: (i) a plurality of substrates each of which includes one or more light-emitting elements, a light sensor, and a memory; (ii) a driving circuit; and (iii) a control circuit, the memory storing information corresponding to a value of an output produced by the light sensor under such condition that each of the light-emitting elements provided in each of the substrates emits light having a predetermined luminance or chromaticity, the method, comprising the steps of:
causing the driving circuit to drive the light-emitting element in a time-sharing manner so that the light sensor detects each of different colors of light emitted from the light-emitting element; and
causing the control circuit to (i) standardize the output of the light sensor in accordance with the information stored in the memory, (ii) generate such a control signal for the driving circuit that the standardized output of the light sensor becomes equal to a set luminance or chromaticity, and (iii) transmit the control signal to the driving circuit.

23. A method for adjusting a backlight device including a plurality of substrates each of which includes one or more light-emitting elements, a substrate light sensor, and a memory, the method, comprising:
a first step of (i) driving each of the light-emitting elements and (ii) detecting, by using an external light sensor used substantially commonly for the substrates, a light intensity of the light-emitting element;
a second step of calculating a light sensor output reference value that is expected from an output produced by the substrate light sensor in the first step; and
a third step of storing the light sensor output reference value in the memory,
the first, second, and third steps being carried out for each of the substrates.

24. The method as set forth in claim 23, wherein:
the light-emitting elements includes a plurality of different colored light-emitting elements that emit light of different colors, and
a series of steps is carried out for each of the different colored light-emitting elements provided in each of the substrates,
the series of steps including:
a first step of (i) driving one of the different colored light-emitting elements and (ii) detecting, by using the external light sensor used substantially commonly for the substrates, a light intensity of the light-emitting element;
a second step of calculating the light sensor output reference value that is expected from the output produced by the substrate light sensor in the first step; and
a third step of storing the light sensor output reference value in the memory.

25. The method as set forth in claim 23, further comprising:
a fourth step of (i) driving the light-emitting element and (ii) detecting, by using the external light sensor, information corresponding to variations in luminance or chromaticity among the light-emitting elements provided in the substrate; and
a fifth step of storing, in the memory, the information corresponding to the variations among the light-emitting elements within the substrate.

26. The method as set forth in claim 23, wherein the light-emitting element is a group of light-emitting elements.

27. The method as set forth in claim 25, wherein the first, second, and third steps are carried out after the fourth and fifth steps are carried out.

28. The method as set forth in claim 25, wherein
the external light sensor is an external light sensor for detecting luminance or chromaticity as an image.

29. The method as set forth in claim 23, wherein
at least the third step is carried out under such condition that a diffusion plate is provided between the substrate and the external light sensor.

* * * * *